US010554076B2

(12) United States Patent
Nakano

(10) Patent No.: US 10,554,076 B2
(45) Date of Patent: Feb. 4, 2020

(54) UNINTERRUPTIBLE POWER SUPPLY

(71) Applicant: TOSHIBA MITSUBISHI-ELECTRIC INDUSTRIAL SYSTEMS CORPORATION, Chuo-ku (JP)

(72) Inventor: Toshihide Nakano, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 116 days.

(21) Appl. No.: 15/736,610

(22) PCT Filed: Jun. 19, 2015

(86) PCT No.: PCT/JP2015/067696
§ 371 (c)(1),
(2) Date: Dec. 14, 2017

(87) PCT Pub. No.: WO2016/203635
PCT Pub. Date: Dec. 22, 2016

(65) Prior Publication Data
US 2018/0191194 A1   Jul. 5, 2018

(51) Int. Cl.
*H02J 9/06* (2006.01)
*H02M 5/458* (2006.01)
*H02M 7/5387* (2007.01)

(52) U.S. Cl.
CPC .......... *H02J 9/062* (2013.01); *H02M 5/4585* (2013.01); *H02M 7/5387* (2013.01)

(58) Field of Classification Search
CPC ..... H02J 9/062; H02M 5/4585; H02M 7/5387
See application file for complete search history.

(56) References Cited

U.S. PATENT DOCUMENTS

2005/0201127 A1   9/2005   Tracy et al.
2015/0008745 A1   1/2015   Navarro

FOREIGN PATENT DOCUMENTS

| JP | 06-113489 A | 4/1994 |
| JP | 2011-223731 A | 11/2011 |
| KR | 10-0509263 B1 | 8/2005 |
| WO | 2015/006151 A1 | 1/2015 |

OTHER PUBLICATIONS

Office Action dated Jun. 5, 2018 in Japanese Patent Application No. 2017-524254 with unedited computer generated English translation.
Korean Office Action dated Feb. 12, 2019 in Korean Patent Application No. 10-2018-7000718 (with unedited computer generated English translation), 9 pages.
International Search Report dated Aug. 25, 2015 in PCT/JP2015/067696, filed on Jun. 19, 2015.

*Primary Examiner* — Carlos Amaya
(74) *Attorney, Agent, or Firm* — Oblon, McClelland, Maier & Neustadt, L.L.P.

(57) ABSTRACT

An uninterruptible power supply includes an AC input terminal (T1) to receive AC power from a commercial AC power source (11), a battery terminal (T2) connected to a battery (12), first and second AC output terminals (T3, T4) connected to first and second loads (13, 14), respectively, a first uninterruptible power source (1-3) to supply AC power to the first load (13) on a full-time inverter feeding system, and a second uninterruptible power source (4-6) to supply AC power to the second load (14) on a full-time commercial feeding system.

15 Claims, 17 Drawing Sheets

UNINTERRUPTIBLE POWER SUPPLY

TECHNICAL FIELD

The present invention relates to an uninterruptible power supply, and more particularly to an uninterruptible power supply that can continue to operate a load during a power failure time.

BACKGROUND ART

Feeding systems of uninterruptible power supplies include a full-time inverter feeding system and a full-time commercial feeding system (see Japanese Patent Laying-Open No. 2011-223731: PTD 1). In an uninterruptible power supply on a full-time inverter feeding system, during a normal time when AC power is supplied from a commercial AC power source, AC power from the commercial AC power source is converted into DC power by a converter and the DC power is stored in a power storage device. Also, the DC power is converted into AC power by an inverter, so that the converted power is supplied to a load. During a power failure time when supply of AC power from the commercial AC power source is stopped, DC power in the power storage device is converted into AC power by the inverter, so that the converted power is supplied to a load.

In an uninterruptible power supply on a full-time commercial feeding system, during a normal time, AC power from a commercial AC power source is supplied to a load and a bidirectional power converter through a high-speed switch, and is converted into DC power by the bidirectional power converter, so that the converted power is stored in a power storage device. During a power failure time, the high-speed switch is OFF and DC power in the power storage device is converted into AC power by the bidirectional power converter, so that the converted power is supplied to a load.

CITATION LIST

Patent Document

PTD 1: Japanese Patent Laying-Open No. 2011-223731

SUMMARY OF INVENTION

Technical Problem

An uninterruptible power supply on a full-time inverter feeding system has the advantage of high reliability because AC power can continue to be supplied to a load by an inverter without interruption when a power failure occurs. Such an uninterruptible power supply, however, has the disadvantage of low efficiency with a loss always produced at an inverter because AC power is supplied to a load by the inverter during a normal time.

An uninterruptible power supply on a full-time commercial feeding system, on the other hand, has the advantage of low loss and high efficiency because power is supplied to a load through a high-speed switch during a normal time. Such an uninterruptible power supply, however, has the disadvantage of low reliability with power supply to a load temporarily stopped during a power failure time because, when a power failure occurs, a high-speed switch is turned OFF and a DC-AC conversion operation of a bidirectional power converter starts.

Accordingly, in a data center, for example, an uninterruptible power supply on a full-time inverter feeding system is introduced as a power source for server, for which greater importance is attached to reliability than efficiency; whereas an uninterruptible power supply on a full-time commercial feeding system is introduced as a power source for air conditioner, for which greater importance is attached to efficiency than reliability. However, installing two uninterruptible power supplies disadvantageously requires a large space for the installation and entails high cost.

Therefore, a main object of the present invention is to provide an uninterruptible power supply that can feed power to two loads, using a full-time inverter feeding system for one load and using a full-time commercial feeding system for the other load.

Solution to Problem

An uninterruptible power supply according to the present invention includes a first terminal configured to receive AC power from a commercial AC power source; a second terminal connected to a power storage device; a third terminal connected to a first load; a fourth terminal connected to a second load; a first uninterruptible power source connected to the first to third terminals; and a second uninterruptible power source connected to the first, second, and fourth terminals. The first uninterruptible power source is configured to convert AC power from the commercial AC power source into DC power, store the DC power in the power storage device, and convert the DC power into AC power to supply the converted power to the first load during a normal time when AC power is supplied from the commercial AC power source. The first uninterruptible power source is configured to convert DC power in the power storage device into AC power to supply the converted power to the load during a power failure time when supply of AC power from the commercial AC power source is stopped. The second uninterruptible power source is configured to supply AC power from the commercial AC power source to the second load during the normal time. The second uninterruptible power source is configured to convert DC power in the power storage device into AC power to supply the converted power to the second load during the power failure time.

Advantageous Effects of Invention

An uninterruptible power supply according to the present invention includes a first terminal to receive AC power from a commercial AC power source, a second terminal connected to a power storage device, a third terminal connected to a first load, a fourth terminal connected to a second load, a first uninterruptible power source on a full-time inverter feeding system connected to the first to third terminals, and a second uninterruptible power source on a full-time commercial feeding system connected to the first, second and fourth terminals. Therefore, power can be fed to the first load and the second load on a full-time inverter feeding system and a full-time commercial feeding system, respectively.

DESCRIPTION OF EMBODIMENTS

Embodiment 1

Figure 1:
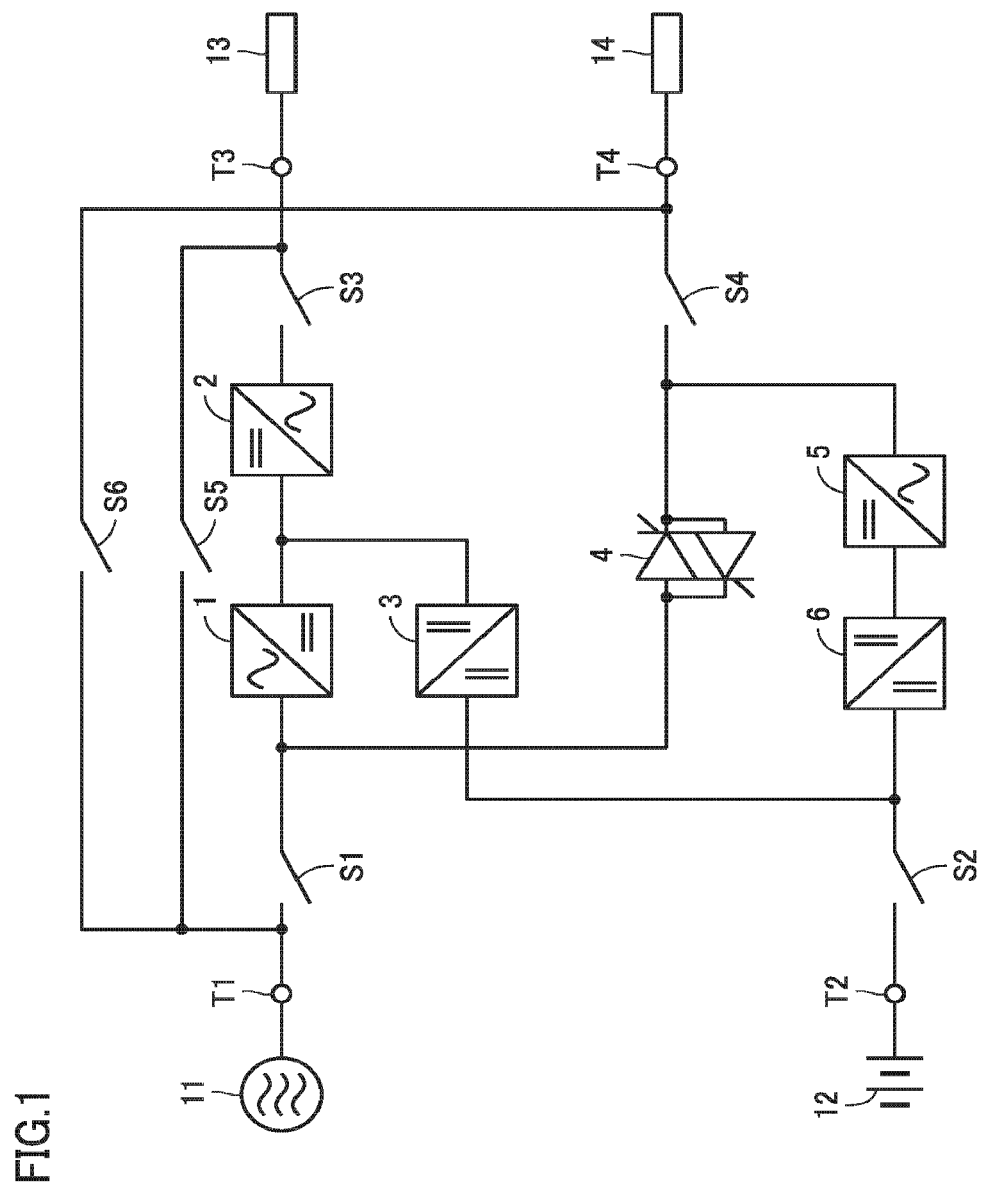
FIG. 1 is a circuit block diagram showing a configuration of an uninterruptible power supply according to Embodiment 1 of the present invention.

FIG. 1 is a circuit block diagram showing a configuration of an uninterruptible power supply according to Embodiment 1 of the present invention. In FIG. 1, the uninterruptible power supply includes an AC input terminal (first terminal) T1, a battery terminal (second terminal) T2, an AC output terminal (third terminal) T3, an AC output terminal (fourth terminal) T4, switches S1-S6, a converter 1, an inverter 2, bidirectional choppers 3, 6, a high-speed switch 4, and a bidirectional power converter 5.

Converter 1, inverter 2, and bidirectional chopper 3 constitute a first uninterruptible power source on a full-time inverter feeding system. High-speed switch 4, bidirectional power converter 5, and bidirectional chopper 6 constitute a second uninterruptible power source on a full-time commercial feeding system. Although the uninterruptible power supply actually receives three-phase AC power and outputs three-phase AC power, FIG. 1 shows a circuit for only a single phase for simplicity of the drawing and the explanation.

AC input terminal T1 receives AC power having a commercial frequency from a commercial AC power source 11. Battery terminal T2 is connected to a battery (power storage device) 12. Battery 12 stores DC power. A capacitor may be connected instead of battery 12.

AC output terminal T3 is used to output AC power on a full-time inverter feeding system and is connected to a load 13. Load 13 is, for example, a server and is driven with AC power having a commercial frequency. AC output terminal T4 is used to output AC power on a full-time commercial feeding system and is connected to a load 14. Load 14 is, for example, an air conditioner and is driven with AC power having a commercial frequency.

Switch S1 has one terminal connected to AC input terminal T1, and has the other terminal connected to the input node of converter 1 and to one terminal of high-speed switch 4. Switch S2 has one terminal connected to battery terminal T2, and has the other terminal connected to bidirectional choppers 3, 6. Switch S3 is connected between the output node of inverter 2 and AC output terminal T3. Switch S4 has one terminal connected to the other terminal of high-speed switch 4 and to bidirectional power converter 5, and has the other terminal connected to AC output terminal T4. Switch S5 is connected between AC input terminal T1 and AC output terminal T3. Switch S6 is connected to between AC input terminal T1 and AC output terminal T4.

During maintenance of the uninterruptible power supply, switches S1-S4 are OFF and switches S5, S6 are ON. Accordingly, commercial AC power source 11 is electrically disconnected from converter 1 and high-speed switch 4, battery 12 is electrically disconnected from bidirectional choppers 3, 6, inverter 2 is electrically disconnected from load 13, and high-speed switch 4 and bidirectional power converter 5 are electrically disconnected from load 14. This allows, for example, inspection, repair, and replacement of converter 1, inverter 2, bidirectional choppers 3, 6, bidirectional power converter 5, and battery 12. AC power is supplied from commercial AC power source 11 through switches S5, S6 to loads 13, 14, so that loads 13, 14 are operated.

During operation of the uninterruptible power supply, switches S1-S4 are ON and switches S5, S6 are OFF. Accordingly, AC power is supplied from commercial AC power source 11 to converter 1 and high-speed switch 4, battery 12 is connected to bidirectional choppers 3, 6, inverter 2 is connected to load 13, and the high-speed switch and bidirectional power converter 5 are connected to load 14. The following description is on the assumption that switches S1-S4 are ON and that switches S5, S6 are OFF.

Converter 1 converts AC power supplied from commercial AC power source 11 through switch S1 into DC power during a normal time when AC power is supplied from commercial AC power source 11. The operation of converter 1 is stopped during a power failure time when supply of AC power from commercial AC power source 11 is stopped. The output node of converter 1 is connected to the input node of inverter 2 and bidirectional chopper 3.

Inverter 2 converts DC power generated by converter 1 into AC power and supplies the AC power to load 13 through switch S3 during a normal time. Inverter 2 converts DC power supplied from battery 12 through switch S2 and bidirectional chopper 3, into AC power, and supplies the AC power to load 13 through switch S3 during a power failure time.

Bidirectional chopper 3 stores DC power generated by converter 1 in battery 12 through switch S2 during a normal time. Bidirectional chopper 3 supplies DC power provided from battery 12 through switch S2 to inverter 2 during a power failure time.

High-speed switch 4 is ON during a normal time and is OFF during a power failure time. FIG. 1 shows a case where high-speed switch 4 is constituted of two thyristors connected in anti-parallel to each other. High-speed switch 4 may be constituted of a semiconductor switch other than a thyristor (e.g. a transistor), or may be constituted of a mechanical switch that can operate at high speed.

Bidirectional power converter 5 is connected between the other terminal of high-speed switch 4 and bidirectional chopper 6. Bidirectional power converter 5 converts AC power supplied from commercial AC power source 11 through high-speed switch 4 into DC power and provides the converted power to bidirectional chopper 6 during a normal time. Bidirectional power converter 5 converts DC power provided from bidirectional chopper 6 into AC power and supplies the converted power to load 14 through switch S4 during a power failure time.

Bidirectional chopper 6 stores DC power generated by bidirectional power converter 5 in battery 12 through switch S2 during a normal time, and supplies DC power in battery 12 to bidirectional power converter 5 during a power failure time.

Next, an operation of the uninterruptible power supply is described. The description is on the assumption that switches S1-S4 are ON and that switches S5, S6 are OFF. During a normal time when AC power is supplied from commercial AC power source 11, AC power from commercial AC power source 11 is converted by converter 1 into DC power and the DC power is stored in battery 12 by bidirectional chopper 3. Also, the DC power is converted into AC power by inverter 2, so that the converted power is supplied to load 13 for load 13 to be operated.

Further, AC power from commercial AC power source 11 is supplied to load 14 through high-speed switch 4, so that load 14 is operated. Also, AC power from commercial AC power source 11 is supplied to bidirectional power converter 5 through high-speed switch 4 and is converted into DC power by bidirectional power converter 5. The DC power is stored in battery 12 through bidirectional chopper 6.

During a power failure time when supply of AC power from commercial AC power source 11 is stopped, the operation of converter 1 is stopped and DC power in battery 12 is supplied to inverter 2 by bidirectional chopper 3. The supplied power is converted into AC power by inverter 2, so that the converted power is supplied to load 13.

Further, high-speed switch 4 is OFF, and commercial AC power source 11 is electrically disconnected from load 13. Also, DC power in battery 12 is supplied to bidirectional power converter 5 by bidirectional chopper 6 and is converted into AC power by bidirectional power converter 5, so that the converted power is supplied to load 14. Thus, the operation of loads 13, 14 is continued as long as battery 12 stores DC power.

With Embodiment 1, AC power can be supplied to load 13 on a full-time inverter feeding system and AC power can be supplied to load 14 on a full-time commercial feeding system with a single uninterruptible power supply. Therefore, downsizing of the device, reduction in cost, simplification in structure, reduction in space for installation can be achieved, compared to a case where an uninterruptible power supply on a full-time inverter feeding system and an uninterruptible power supply on a full-time commercial feeding system are separately provided.

Figure 2:
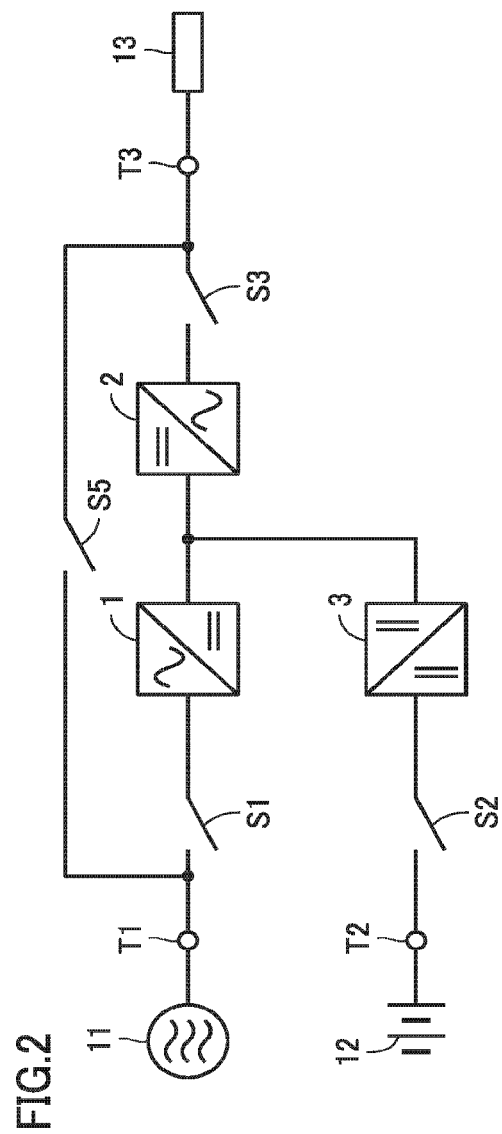
FIG. 2 is a circuit block diagram showing a comparative example of Embodiment 1.

FIG. 2 is a circuit block diagram showing a comparative example of Embodiment 1, FIG. 2 being contrasted with FIG. 1. With reference to FIG. 2, the uninterruptible power supply is different from the uninterruptible power supply of FIG. 1 in that the former is not provided with AC output terminal T4, switches S4, S6, high-speed switch 4, bidirectional power converter 5, and bidirectional chopper 6. The uninterruptible power supply of FIG. 2 supplies AC power to load 13 on a full-time inverter feeding system.

Figure 3:
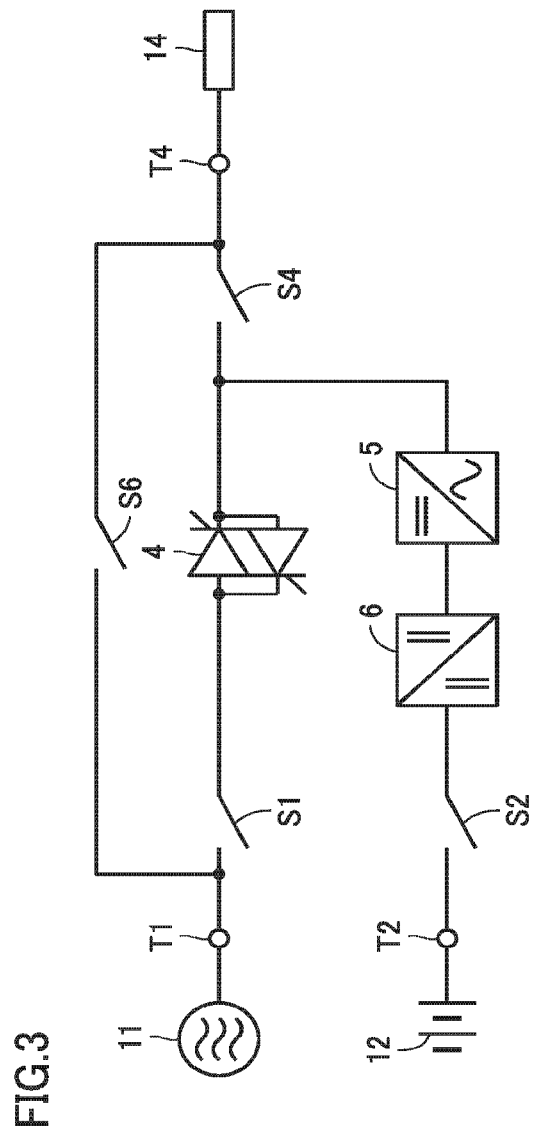
FIG. 3 is a circuit block diagram showing another comparative example of Embodiment 1.

FIG. 3 is a circuit block diagram showing another comparative example of Embodiment 1, FIG. 3 being contrasted with FIG. 1. With reference to FIG. 3, the uninterruptible power supply is different from the uninterruptible power supply of FIG. 1 in that the former is not provided with AC output terminal T3, switches S3, S5, converter 1, inverter 2, and bidirectional chopper 3. The uninterruptible power supply of FIG. 3 supplies AC power to load 14 on a full-time commercial feeding system.

The uninterruptible power supply of FIG. 2 includes, for example, battery 12, four switches S1-S3, S5, a cooling fan (not shown), and a housing (not shown) that houses these parts. The uninterruptible power supply of FIG. 3 includes, for example, battery 12, four switches S1, S2, S4, S6, a cooling fan (not shown), and a housing (not shown) that houses these parts. The uninterruptible power supply of FIG. 1 includes, for example, battery 12, six switches switch S1-S6, a cooling fan (not shown), and a housing (not shown) that houses these parts.

Accordingly, installing the uninterruptible power supply of FIG. 1 only requires reduced numbers of batteries 12, switches, cooling fans, and housings, compared to the case of installing both the uninterruptible power supplies of FIGS. 2 and 3. Therefore, downsizing of the device, reduction in cost, simplification in structure, reduction in space for installation can be achieved.

Embodiment 2

Figure 4:
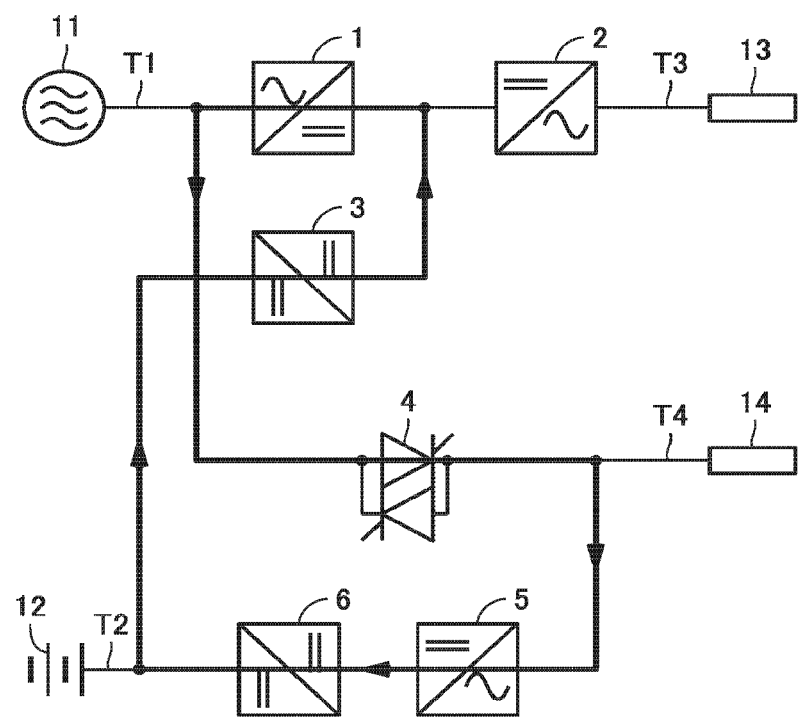
FIG. 4 is a circuit block diagram for explaining a problem of the uninterruptible power supply shown in FIG. 1.

FIG. 4 is a circuit block diagram for explaining a problem of the uninterruptible power supply shown in FIG. 1. FIG. 4 shows a case where switches S1-S4 are ON and where switches S5, S6 are OFF, although switches S1-S6 are not shown. When the uninterruptible power supply shown in FIG. 1 is operated, a circulating circuit may be formed by converter 1, high-speed switch 4, bidirectional power converter 5, bidirectional chopper 6, and bidirectional chopper 3 as shown in FIG. 4, causing a flow of circulating current. If such a circulating current flows, it is difficult to accurately control a current flowing through converter 1, bidirectional choppers 3, 6, and bidirectional power converter 5.

Figure 5:
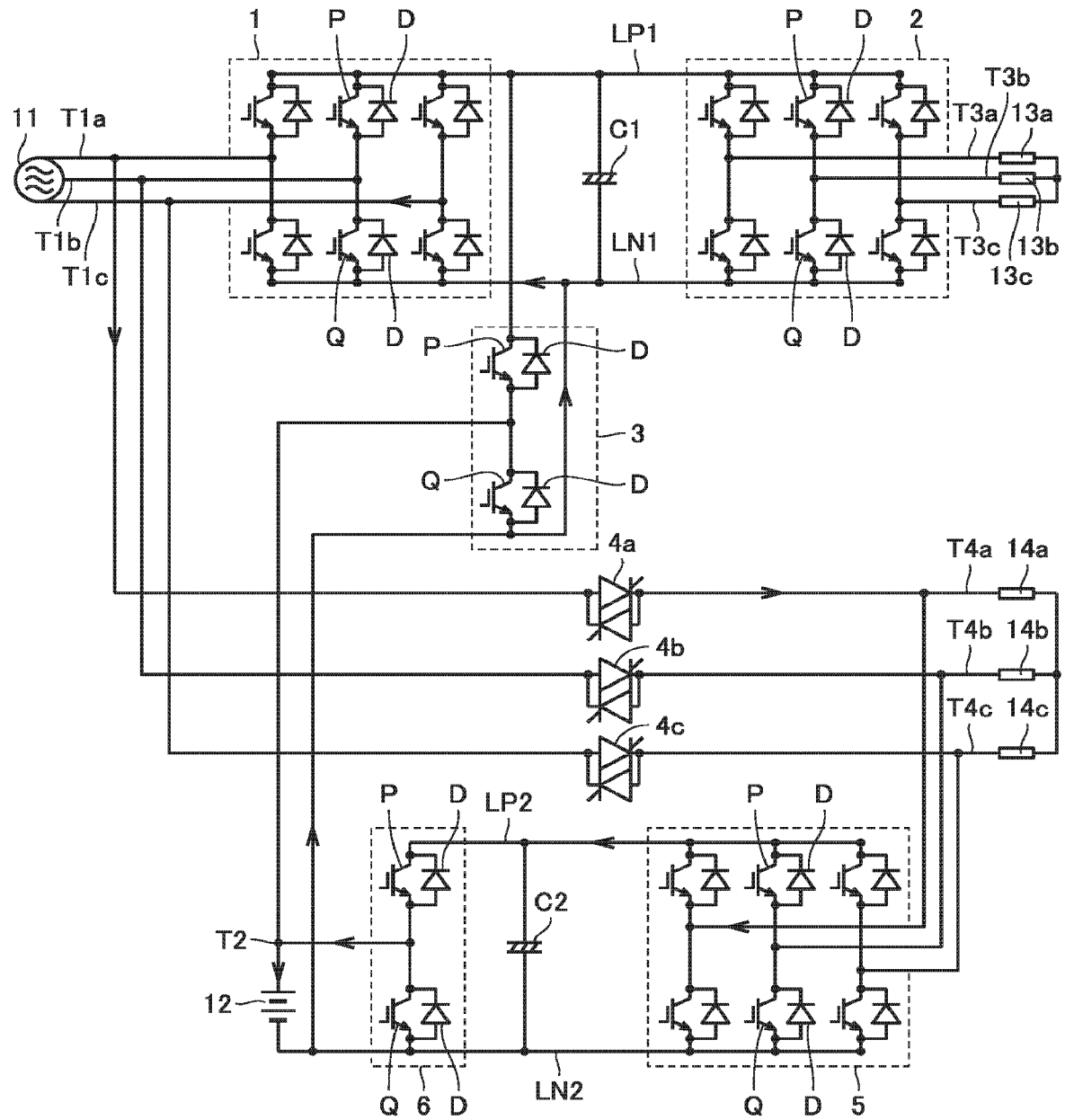
FIG. 5 is a circuit diagram for explaining in detail the problem explained in FIG. 4.

FIG. 5 is a circuit diagram showing in more derail a configuration of the uninterruptible power supply shown in FIG. 4. The uninterruptible power supply of FIG. 5 actually includes three AC input terminals T1a-T1c for receiving three-phase AC power from commercial AC power source 11, three AC output terminals T3a-T3c for outputting three-phase AC power on a full-time inverter feeding system, and three AC output terminals T4a-T4c for outputting three-phase AC power on a full-time commercial feeding system.

To each of AC output terminals T3a-T3c, one terminal of a corresponding one of loads 13a-13c to be driven with three-phase AC power is connected. The other terminal of each of loads 13a-13c is connected to each other. To AC output terminals T4a-T4c, loads 14a-14c to be driven with three-phase AC power are connected. The other terminal of each of loads 14a-14c is connected to each other.

Converter 1 includes three sets each of transistor P and diode D and three sets each of transistor Q and diode D. Three transistors P have collectors all connected to DC positive bus LP1, and have emitters each connected to a corresponding one of AC input terminals T1a-T1c through a corresponding one of three switches S1 (not shown). Three transistors Q have collectors each connected to the emitter of a corresponding one of three transistors P, and have emitters all connected to DC negative bus LN1. Each of six diodes D is connected in anti-parallel to a corresponding one of three transistors P and three transistors Q.

A three-phase AC voltage from commercial AC power source 11 can be converted into a DC voltage by turning ON/OFF three transistors P and three transistors Q in a predetermined order in synchronization with the three-phase AC voltage. A DC voltage generated by converter 1 is supplied between DC positive bus LP1 and DC negative bus LN1. Between DC positive bus LP1 and DC negative bus LN1, a capacitor C1 is connected to smooth a DC voltage.

Inverter 2, which is similar to converter 1 in configuration, includes three sets each of transistor P and diode D and three sets each of transistor Q and diode D. Three transistors P have collectors all connected to DC positive bus LP1, and have emitters each connected to a corresponding one of AC output terminals T3a-T3c through a corresponding one of three switches S3 (not shown). Three transistors Q have collectors each connected to the emitter of a corresponding one of three transistors P, and have emitters all connected to DC negative bus LN1. Each of six diodes D is connected in anti-parallel to a corresponding one of three transistors P and three transistors Q.

A DC voltage can be converted into a three-phase AC voltage by turning ON/OFF each transistor Q in synchronization with a three-phase AC voltage from commercial AC power source 11. A three-phase AC voltage generated by inverter 2 is supplied to loads 13a-13c through three switches S3 (not shown) and AC output terminals T3a-T3c.

Bidirectional chopper 3 includes two transistors P, Q, two diodes D, and a reactor (not shown). Transistor P has a collector connected to DC positive bus LP1, and has an emitter connected to battery terminal T2 through the reactor (not shown). Transistor Q has a collector connected to the emitter of transistor P, and has an emitter connected to DC negative bus LN1 and the negative electrode of battery 12. Each of two diodes D is connected in anti-parallel to a corresponding one of two transistors P, Q.

During charge of battery 12, transistor Q is OFF, transistor P is turned ON/OFF in a predetermined cycle, and DC power generated by converter 1 is supplied to battery 12. During discharge of battery 12, transistor P is OFF, transistor Q is turned ON/OFF in a predetermined cycle, and DC power in battery 12 is supplied to inverter 2.

High-speed switches 4a-4c each have one terminal connected to a corresponding one of AC input terminals T1a-T1c through a corresponding one of three switches S1 (not shown). High-speed switches 4a-4c each have the other terminal connected to a corresponding one of AC output terminals T4a-T4c through a corresponding one of three switches S4 (not shown).

Bidirectional power converter 5, which is similar to inverter 2 in configuration, includes three sets of transistors P and diodes D and three sets of transistors Q and diodes D. Three transistors P have collectors all connected to DC positive bus LP2, and have emitters each connected to a corresponding one of AC output terminals T4a-T4c through a corresponding one of three switches S4 (not shown). Three transistors Q have collectors each connected to the emitter of a corresponding one of three transistors P, and have emitters all connected to DC negative bus LN2. Each of six diodes D is connected in anti-parallel to a corresponding one of three transistors P and three transistors Q.

A three-phase AC voltage from commercial AC power source 11 can be converted into a DC voltage by turning ON/OFF three transistors P and three transistors Q in a predetermined order in synchronization with the three-phase AC voltage and, conversely, a DC voltage can be converted into a three-phase AC voltage. A three-phase AC voltage generated by bidirectional power converter 5 is supplied to loads 14a-14c through three switches S4 (not shown) and AC output terminals T4a-T4c.

A DC voltage generated by bidirectional power converter 5 is supplied between DC positive bus LP2 and DC negative bus LN2. Between DC positive bus LP2 and DC negative bus LN2, a capacitor C2 is connected to smooth a DC voltage.

Bidirectional chopper 6 includes two transistors P, Q, two diodes D, and a reactor (not shown). Transistor P has a collector connected to DC positive bus LP2, and has an emitter connected to battery terminal T2 through the reactor (not shown). Transistor Q has a collector connected to the emitter of transistor P, and has an emitter connected to DC negative bus LN2 and the negative electrode of battery 12. Each of two diodes D is connected in anti-parallel to a corresponding one of two transistors P, Q.

During charge of battery 12, transistor Q is OFF, transistor P is turned ON/OFF in a predetermined cycle, and DC power generated by bidirectional power converter 5 is supplied to battery 12. During discharge of battery 12, transistor P is OFF, transistor Q is turned ON/OFF in a predetermined cycle, and DC power in battery 12 is supplied to bidirectional power converter 5.

When such an uninterruptible power supply is operated, a circulating circuit may be formed from commercial AC power source 11 through AC input terminal T1a, high-speed switch 4a, diode D of bidirectional power converter 5, DC positive bus LP2, transistor P of bidirectional chopper 6, battery terminal T2, battery 12, bidirectional chopper 3, DC negative bus LN1, diode D of converter 1, and AC input terminal T1c to commercial AC power source 11, as indicated by the arrows in FIG. 5, causing a flow of circulating current.

Intrinsically, the sum of three-phase AC current flowing from commercial AC power source 11 to converter 1 is 0 A, and the sum of three-phase AC current flowing from commercial AC power source 11 through high-speed switches 4a-4c to bidirectional power converter 5 is 0 A. The sum of current flowing from bidirectional chopper 3 to the positive electrode of battery 12 and current flowing from bidirectional chopper 3 to the negative electrode of battery 12 is 0 A. The sum of current flowing from bidirectional chopper 6 to the positive electrode of battery 12 and current flowing from bidirectional chopper 6 to the negative electrode of battery 12 is 0 A. However, if the above-described circulating current flows, each sum of the currents is not 0 A, making it difficult to accurately control a current flowing through converter 1, bidirectional choppers 3, 6, and bidirectional power converter 5. Embodiment 2 overcomes such a problem.

Figure 6:
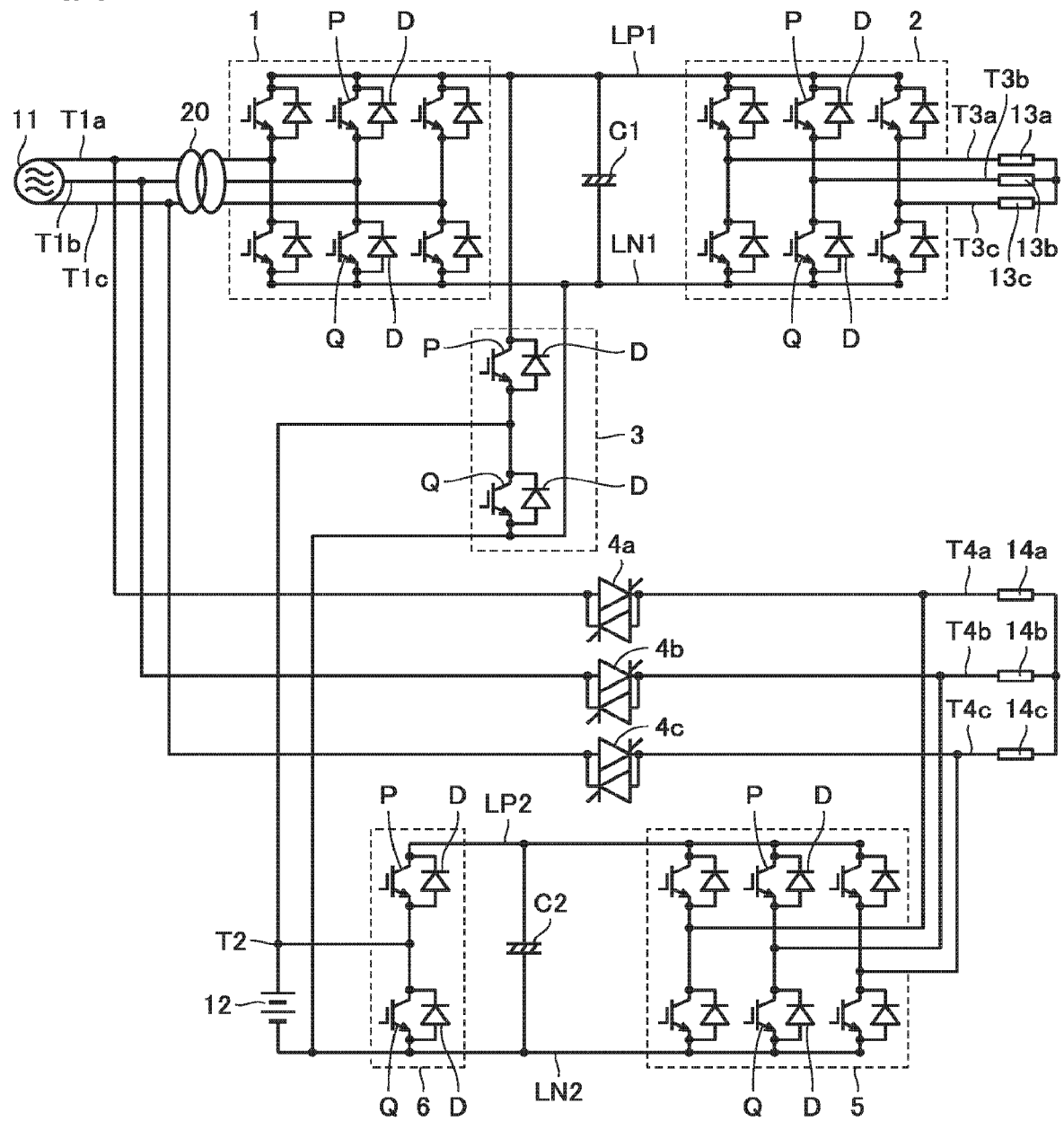
FIG. 6 is a circuit diagram showing a configuration of an uninterruptible power supply according to Embodiment 2 of the present invention.

FIG. 6 is a circuit diagram showing a configuration of an uninterruptible power supply according to Embodiment 2 of the present invention, FIG. 6 being contrasted with FIG. 5. With reference to FIG. 6, the uninterruptible power supply is different from the uninterruptible power supply of FIG. 5 in that the former additionally includes an isolation transformer 20.

Isolation transformer 20 has three primary terminals (one terminal of each of three primary windings) each connected to a corresponding one of AC input terminals T1a-T1c through a corresponding one of three switches S1 (not shown), and each connected to one terminal of a corresponding one of high-speed switches 4a-4c. Isolation transformer 20 has three secondary terminals (one terminal of each of three secondary windings) each connected to a corresponding one of the three input nodes (the emitter of a corresponding one of three transistors P) of converter 1. Isolation transformer 20 transmits three-phase AC power supplied from commercial AC power source 11 to converter 1.

At isolation transformer 20, the sum of three-phase AC current flowing through the three primary terminals is 0 A, and the sum of three-phase AC current flowing through the three secondary terminals is 0 A. Therefore, a flow of circulating current as shown in FIG. 5 can be prevented, enabling accurate control of a current flowing through converter 1, bidirectional choppers 3, 6, and bidirectional power converter 5.

Although isolation transformer 20 is disposed near converter 1 in Embodiment 2, the present invention is not limited as such. The isolation transformer may be disposed at any location on the path where an AC current flows in the circulating circuit shown in FIG. 5.

Figure 7:
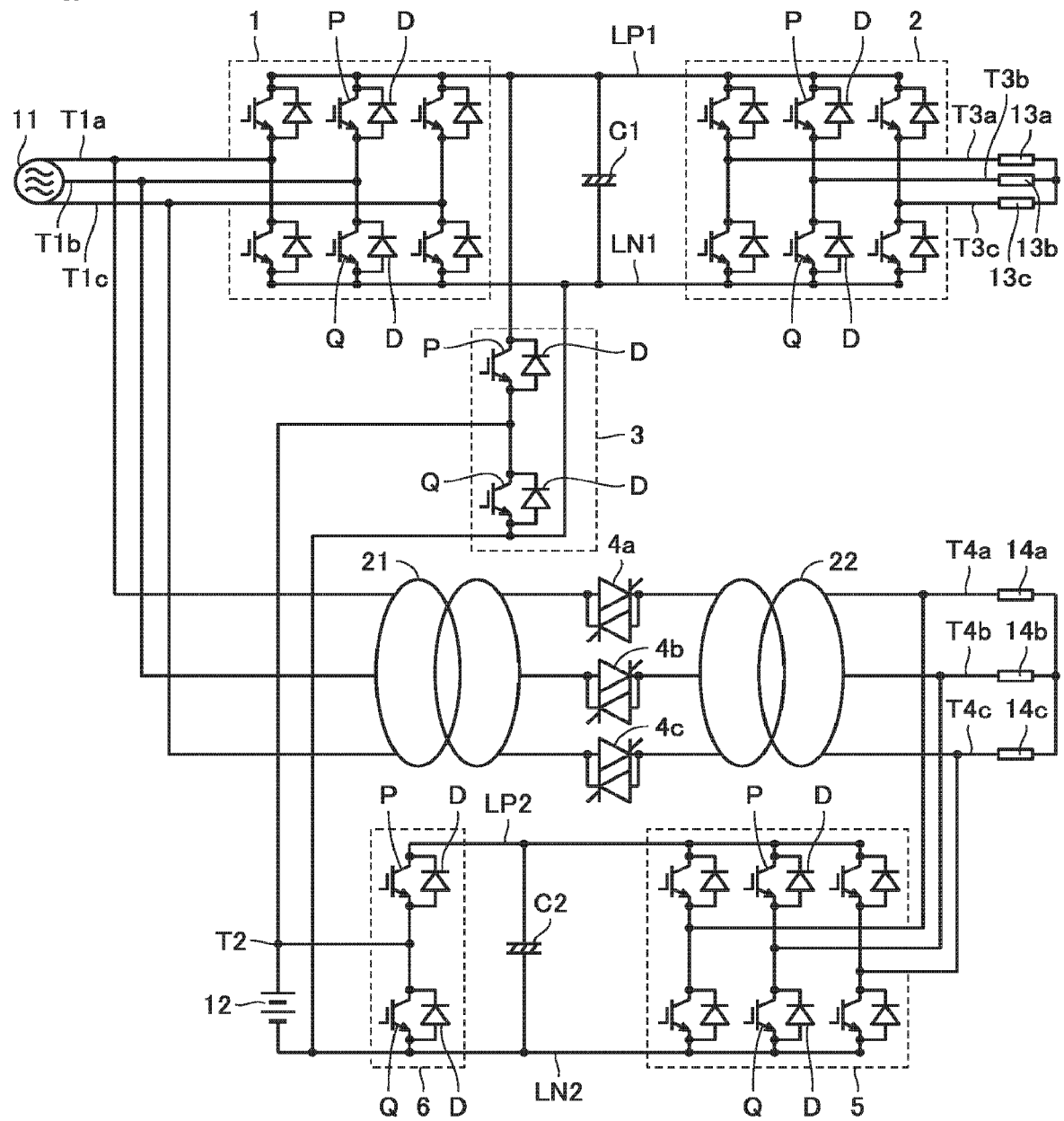
FIG. 7 is a circuit diagram showing a variation of Embodiment 2.

FIG. 7 is a circuit block diagram showing a configuration of an uninterruptible power supply, which is a variation of Embodiment 2, FIG. 7 being contrasted with FIG. 5. With reference to FIG. 7, the uninterruptible power supply is different from the uninterruptible power supply of FIG. 5 in that the former additionally includes isolation transformers 21, 22.

Isolation transformer 21 has three primary terminals each connected to a corresponding one of AC input terminals T1a-T1c through a corresponding one of three switches S1 (not shown), and each connected to a corresponding one of the three input nodes of converter 1. Isolation transformer 21 has three secondary terminals each connected to one terminal of a corresponding one of high-speed switches 4a-4c. Isolation transformer 21 transmits three-phase AC power supplied from commercial AC power source 11 to one terminal of each of high-speed switches 4a-4c.

Isolation transformer 22 has three primary terminals each connected to the other terminal of a corresponding one of high-speed switches 4a-4c. Isolation transformer 22 has three secondary terminals each connected to a corresponding one of AC output terminals T4a-T4c through a corresponding one of three switches S4 (not shown), and each connected to a corresponding one of the three AC nodes (the emitter of a corresponding one of three transistors P) of bidirectional power converter 5. Isolation transformer 22 transmits three-phase AC power supplied from commercial AC power source 11 through isolation transformer 21 and high-speed switches 4a-4c to AC output terminals T4a-T4c and bidirectional power converter 5.

With this variation, the same advantageous effects as those of Embodiment 2 can be obtained. If any one of two isolation transformers 21, 22 is only provided, the same advantageous effects can be obtained.

Figure 8:
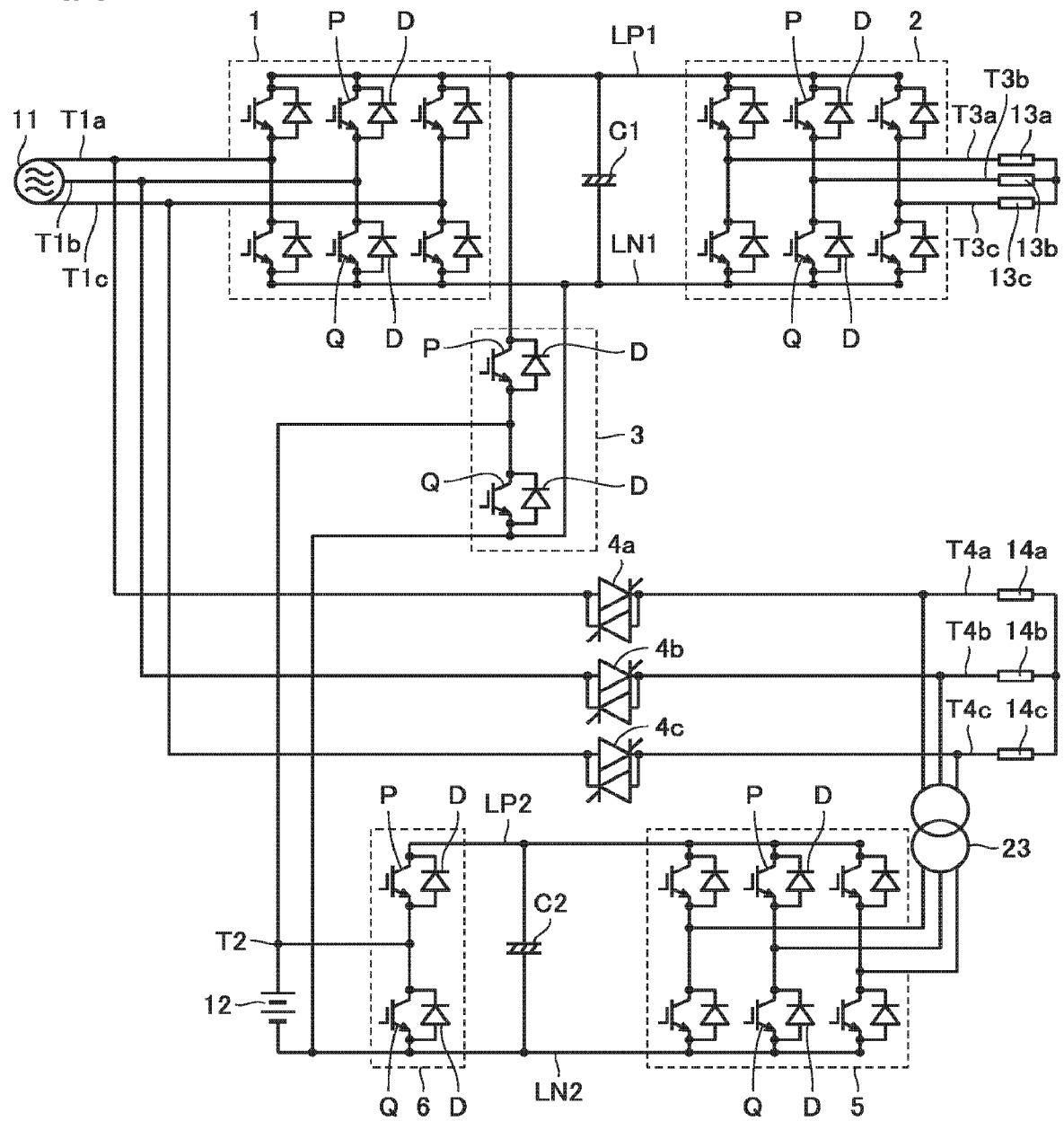
FIG. 8 is a circuit diagram showing another variation of Embodiment 2.

FIG. 8 is a circuit block diagram showing a configuration of an uninterruptible power supply, which is another variation of Embodiment 2, FIG. 8 being contrasted with FIG. 5. With reference to FIG. 8, the uninterruptible power supply is different from the uninterruptible power supply of FIG. 5 in that the former additionally includes an isolation transformer 23.

Isolation transformer 23 has three primary terminals each connected to the other terminal of a corresponding one of high-speed switches 4a-4c, and each connected to a corresponding one of AC output terminals T4a-T4c through a corresponding one of three switches (not shown). Isolation transformer 23 has three secondary terminals each connected to a corresponding one of the three AC nodes (the emitter of a corresponding one of three transistors P) of bidirectional power converter 5. Isolation transformer 23 transmits three-phase AC power supplied from commercial AC power source 11 through high-speed switches 4a-4c to bidirectional power converter 5 during a normal time, and transmits three-phase AC power generated by bidirectional power converter 5 to loads 14a-14c during a power failure time. With this variation, the same advantageous effects as those of Embodiment 2 can be obtained.

In the uninterruptible power supply of FIG. 6, during a normal time, AC power to be consumed by loads 13a-13c passes through isolation transformer 20, and a loss is generated at isolation transformer 20. In the uninterruptible power supply of FIG. 7, during a normal time, AC power to be consumed by loads 14a-14c passes through isolation transformers 21, 22, and a loss is generated at isolation transformers 21, 22. In the uninterruptible power supply of FIG. 8, during a normal time, AC power necessary to charge battery 12 passes through isolation transformer 23, and a loss is generated at isolation transformer 23. Of isolation transformers 20-23, isolation transformer 23 has the least AC power passing therethrough. Therefore, of isolation transformers 20-23, isolation transformer 23 generates the least loss.

Embodiment 3

In Embodiment 2, a circulating current is interrupted by providing an isolation transformer on the path where an AC current flows in a circulating circuit. In Embodiment 3, a circulating current is interrupted by providing diodes (rectifier element) on the path where a DC current flows in a circulating circuit. While the uninterruptible power supply in Embodiment 1 is provided with two bidirectional choppers 3, 6, battery 12 can be charged by either one of bidirectional choppers 3, 6 during a normal time and battery 12 can be discharged by bidirectional choppers 3, 6 during a power failure time. Accordingly, diodes can be connected on the current path of either one of bidirectional choppers 3, 6 in such a direction as to interrupt a charge current of battery 12 and as to allow a discharge current to flow.

Figure 9:
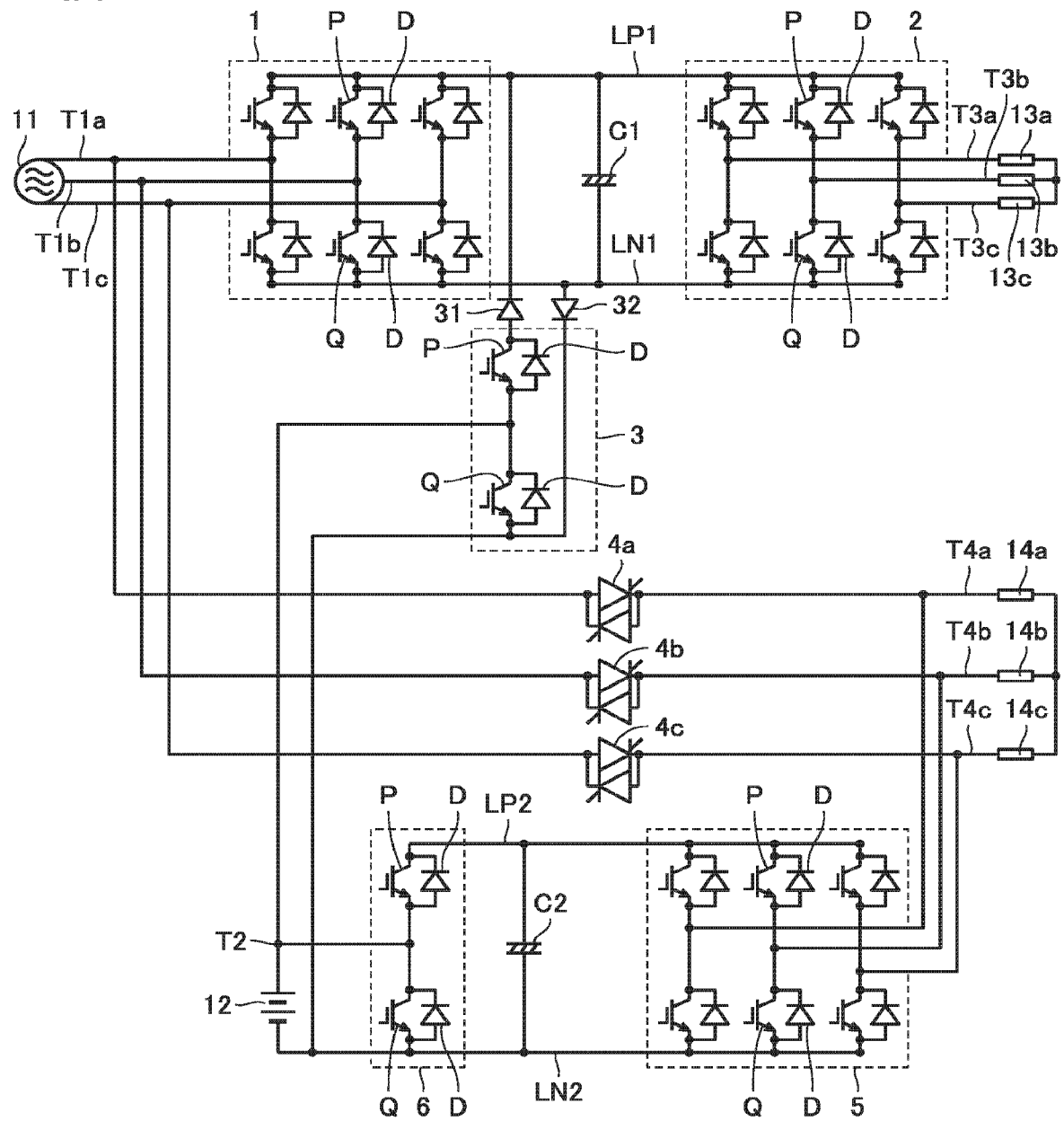
FIG. 9 is a circuit diagram showing a configuration of an uninterruptible power supply according to Embodiment 3 of the present invention.

FIG. 9 is a circuit diagram showing a configuration of an uninterruptible power supply according to Embodiment 3 of the present invention, FIG. 9 being contrasted with FIG. 5. With reference to FIG. 9, the uninterruptible power supply is different from the uninterruptible power supply of FIG. 5 in that the former additionally includes diodes 31, 32.

Diode 31 has an anode connected to the collector of transistor P of bidirectional chopper 3, and has a cathode connected to DC positive bus LP1. Diode 32 has an anode connected to DC negative bus LN1, and has a cathode connected to the emitter of transistor Q of bidirectional chopper 3. Diodes 31, 32 allow a current to flow from battery 12 through bidirectional chopper 3 to inverter 2, and prohibit a current from flowing from converter 1 through bidirectional chopper 3 to battery 12.

During a normal time when three-phase AC power is supplied from commercial AC power source 11, the operation of bidirectional chopper 3 is stopped and DC power generated by bidirectional power converter 5 is stored in battery 12 by bidirectional chopper 6. During this time, diodes 31, 32 interrupt the circulating current indicated by the arrows in FIG. 5.

During a power failure time when supply of three-phase AC power from commercial AC power source 11 is stopped, the operation of converter 1 is stopped and DC power in battery 12 is supplied to inverter 2 through bidirectional chopper 3. Also, high-speed switches 4a-4c are OFF and DC power in battery 12 is supplied to bidirectional power converter 5 through bidirectional chopper 6. During this time, since the operation of converter 1 is stopped and high-speed switches 4a-4c are OFF, a circulating circuit is not formed.

With Embodiment 3, the same advantageous effects as those of Embodiment 2 can be obtained. In addition, since diodes 31, 32 are smaller in size, less expensive, and have a lower loss than isolation transformers 20-23, downsizing of the device, reduction in cost, and improvement in efficiency can be achieved compared to Embodiment 2.

Figure 10:
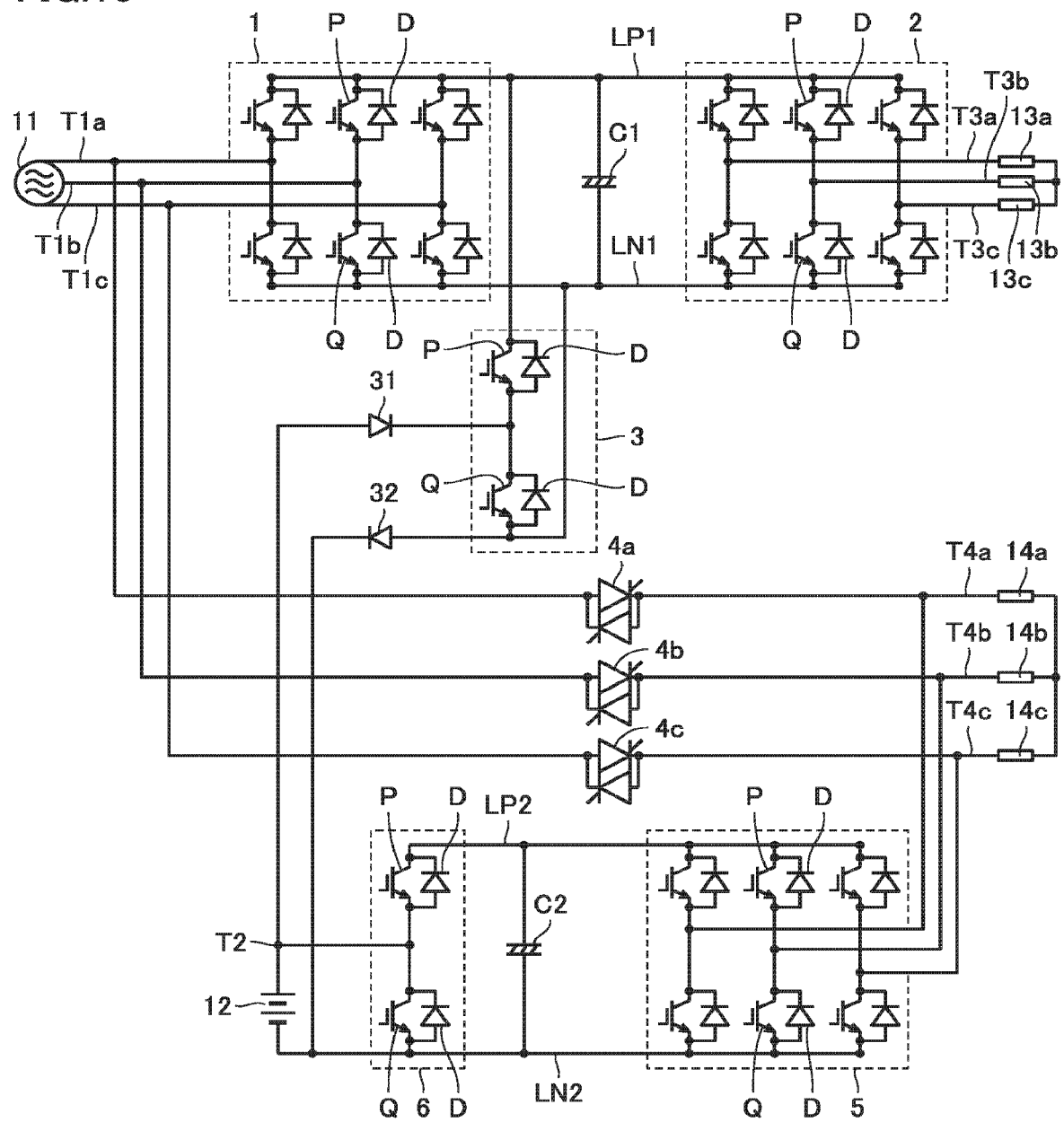
FIG. 10 is a circuit diagram showing a variation of Embodiment 3.

FIG. 10 is a circuit block diagram showing a variation of Embodiment 3, FIG. 10 being contrasted with FIG. 9. With reference to FIG. 10, the uninterruptible power supply is different from the uninterruptible power supply of FIG. 9 in positions of diodes 31, 32. Diode 31 has an anode connected to battery terminal T2, and has a cathode connected to the emitter of transistor P through a reactor (not shown) of bidirectional chopper 3. Diode 32 has an anode connected to the emitter of transistor Q of bidirectional chopper 3, and has a cathode connected to the negative electrode of battery 12. With this variation, the same advantageous effects as those of Embodiment 3 can be obtained.

Embodiment 4

In Embodiment 3, bidirectional chopper 3 of two bidirectional choppers 3, 6 is used as a chopper exclusively for discharge. In Embodiment 4, bidirectional chopper 6 of two bidirectional choppers 3, 6 is used as a chopper exclusively for discharge.

Figure 11:
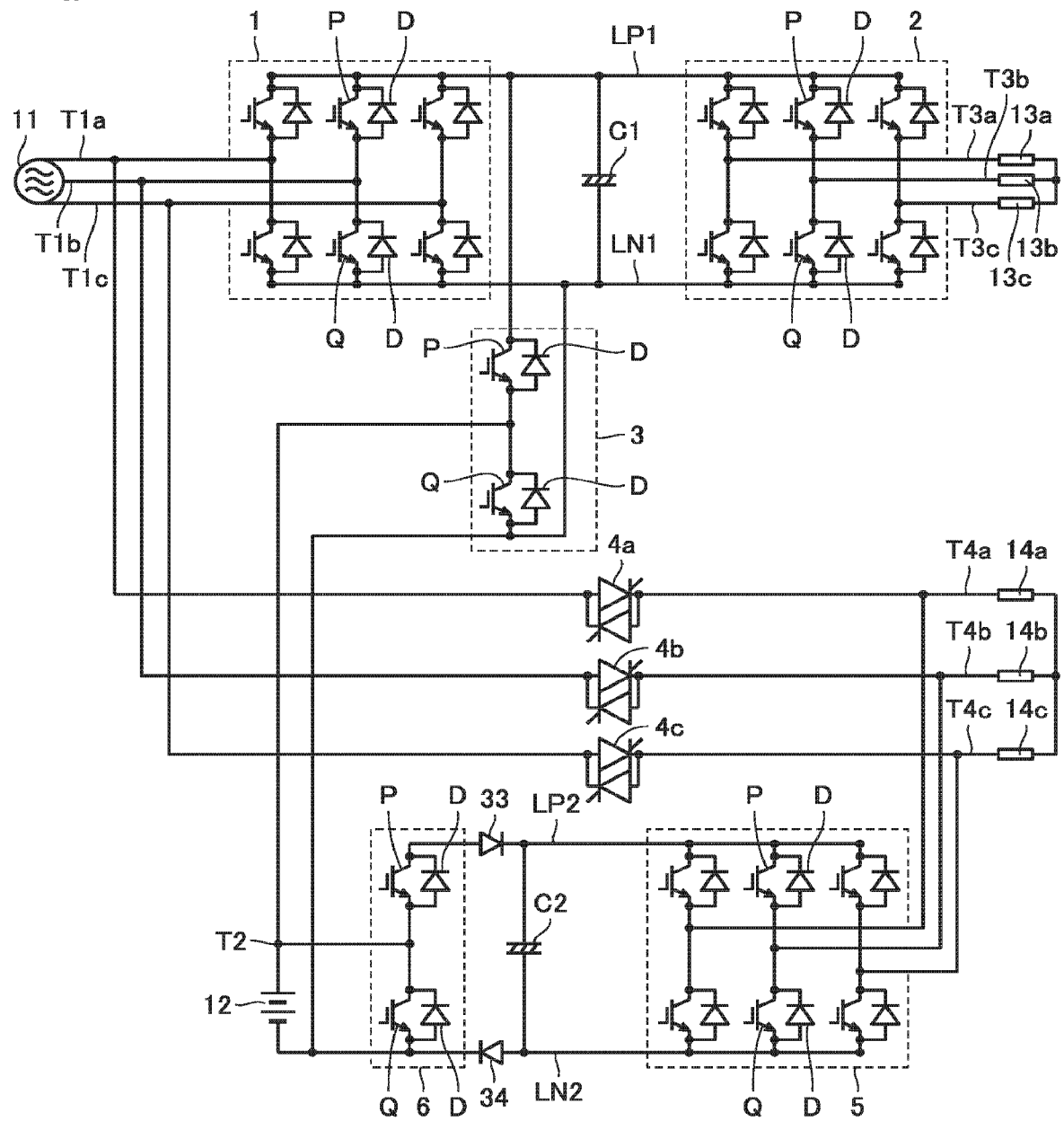
FIG. 11 is a circuit diagram showing a configuration of an uninterruptible power supply according to Embodiment 4 of the present invention.

FIG. 11 is a circuit diagram showing a configuration of an uninterruptible power supply according to Embodiment 4 of the present invention, FIG. 11 being contrasted with FIG. 5. With reference to FIG. 11, the uninterruptible power supply is different from the uninterruptible power supply of FIG. 5 in that the former additionally includes diodes 33, 34.

Diode 33 has an anode connected to the collector of transistor P of bidirectional chopper 6, and has a cathode connected to DC positive bus LP2. Diode 34 has an anode connected to DC negative bus LN2, and has a cathode connected to the emitter of transistor Q of bidirectional chopper 6. Diodes 33, 34 allow a current to flow from battery 12 through bidirectional chopper 6 to bidirectional power converter 5, and prohibit a current from flowing from bidirectional power converter 5 through bidirectional chopper 6 to battery 12.

During a normal time when three-phase AC power is supplied from commercial AC power source 11, the operation of bidirectional chopper 6 is stopped and DC power generated by converter 1 is stored in battery 12 by bidirectional chopper 3. During this time, diodes 33, 34 interrupt the circulating current indicated by the arrows in FIG. 5.

During a power failure time when supply of three-phase AC power from commercial AC power source 11 is stopped, the operation of converter 1 is stopped and DC power in battery 12 is supplied to inverter 2 through bidirectional chopper 3. Also, high-speed switches 4a-4c are OFF and DC power in battery 12 is supplied to bidirectional power converter 5 through bidirectional chopper 6. During this time, since the operation of converter 1 is stopped and high-speed switches 4a-4c are OFF, a circulating circuit is not formed.

With Embodiment 4, the same advantageous effects as those of Embodiment 2 can be obtained. In addition, since diodes 33, 34 are smaller in size, less expensive, and have a lower loss than isolation transformers 20-23, downsizing of the device, reduction in cost, and improvement in efficiency can be achieved compared to Embodiment 2.

If loads 13a-13c are larger in consumption current than loads 14a-14c, diodes 33, 34 smaller in size than diodes 31, 32 of Embodiment 3 can be used. On the other hand, if loads 14a-14c are larger in consumption current than loads 13a-13c, diodes 33, 34 to be used need to be larger in size than diodes 31, 32 of Embodiment 3.

Figure 12:
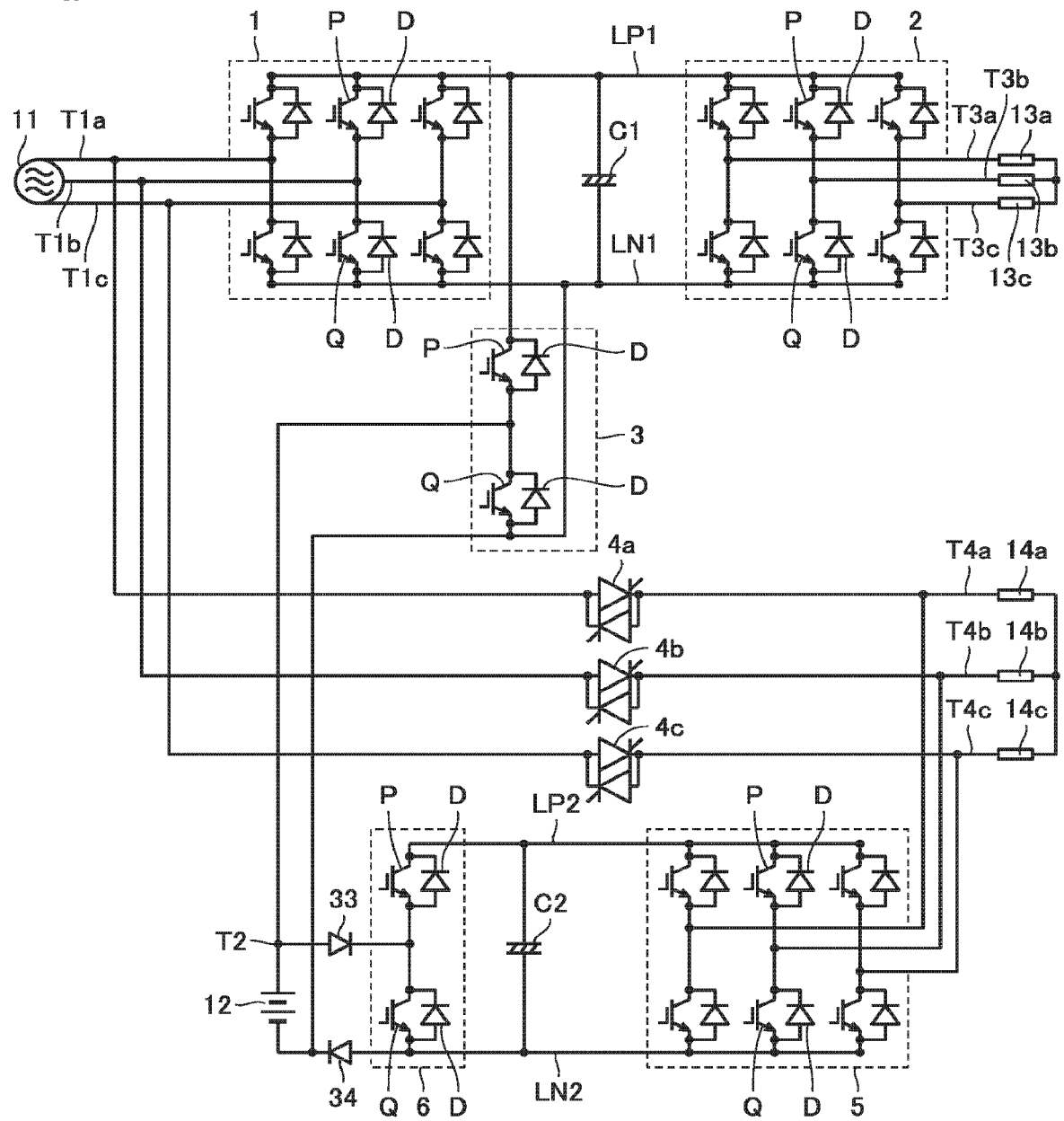
FIG. 12 is a circuit diagram showing a variation of Embodiment 4.

FIG. 12 is a circuit diagram showing a configuration of an uninterruptible power supply, which is a variation of Embodiment 4, FIG. 12 being contrasted with FIG. 11. With reference to FIG. 12, the uninterruptible power supply is different from the uninterruptible power supply of FIG. 11 in positions of diodes 33, 34. Diode 33 has an anode connected to battery terminal T2, and has a cathode connected to the emitter of transistor P through a reactor (not shown) of bidirectional chopper 6. Diode 34 has an anode connected to the emitter of transistor Q of bidirectional chopper 6, and has a cathode connected to the negative electrode of battery 12. With this variation, the same advantageous effects as those of Embodiment 4 can be obtained.

Embodiment 5

Figure 13:
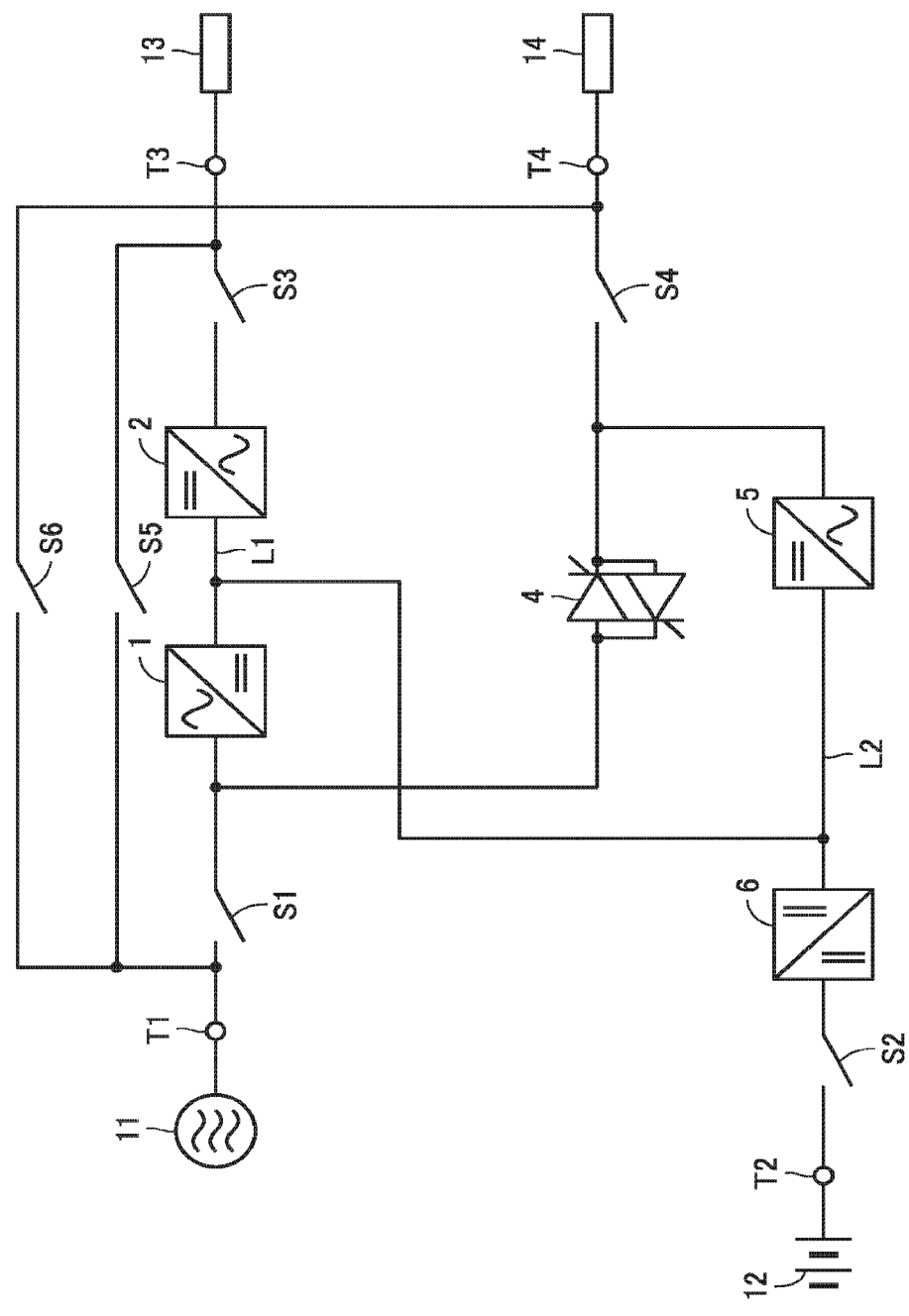
FIG. 13 is a circuit block diagram showing a configuration of an uninterruptible power supply according to Embodiment 5 of the present invention.

FIG. 13 is a circuit diagram showing a configuration of an uninterruptible power supply according to Embodiment 5 of the present invention, FIG. 13 being contrasted with FIG. 1. With reference to FIG. 13, the uninterruptible power supply is different from the uninterruptible power supply of FIG. 1 in that bidirectional chopper 3 is not provided and in that a DC bus L1 between converter 1 and inverter 2 and a DC bus L2 between bidirectional power converter 5 and bidirectional chopper 6 are connected to each other.

Converter 1 and inverter 2 constitute a first uninterruptible power source on a full-time inverter feeding system. High-speed switch 4, bidirectional power converter 5, and bidirectional chopper 6 constitute a second uninterruptible power source on a full-time commercial feeding system. Bidirectional chopper 6 is shared by the first and second uninterruptible power sources.

During a normal time when three-phase AC power is supplied from commercial AC power source 11, AC power from commercial AC power source 11 is converted into DC power by converter 1 and the DC power is stored in battery 12 by bidirectional chopper 6. Also, the DC power is converted into AC power by inverter 2, so that the converted power is supplied to load 13. Further, high-speed switch 4 is ON and AC power from commercial AC power source 11 is supplied to load 14 through high-speed switch 4. Also, AC power from commercial AC power source 11 is converted into DC power by bidirectional power converter 5, so that the DC power is stored in battery 12 by bidirectional chopper 6.

During a power failure time when supply of three-phase AC power from commercial AC power source 11 is stopped, the operation of converter 1 is stopped and high-speed switch 4 is OFF. DC power in battery 12 is supplied to inverter 2 and bidirectional power converter 5 by bidirectional chopper 6. Inverter 2 converts DC power supplied from battery 12 through bidirectional chopper 6 into AC power, and supplies the converted power to load 13. Bidirectional power converter 5 converts DC power supplied from battery 12 through bidirectional chopper 6 into AC power, and supplies the converted power to load 14. The other features and operations are the same as those of Embodiment 1, and thus the explanations for them are not repeated.

With Embodiment 5, the same advantageous effects as those of Embodiment 1 can be obtained. In addition, since bidirectional chopper 3 is not provided, downsizing of the device, reduction in cost, and simplification in structure can be achieved.

Embodiment 6

Figure 14:
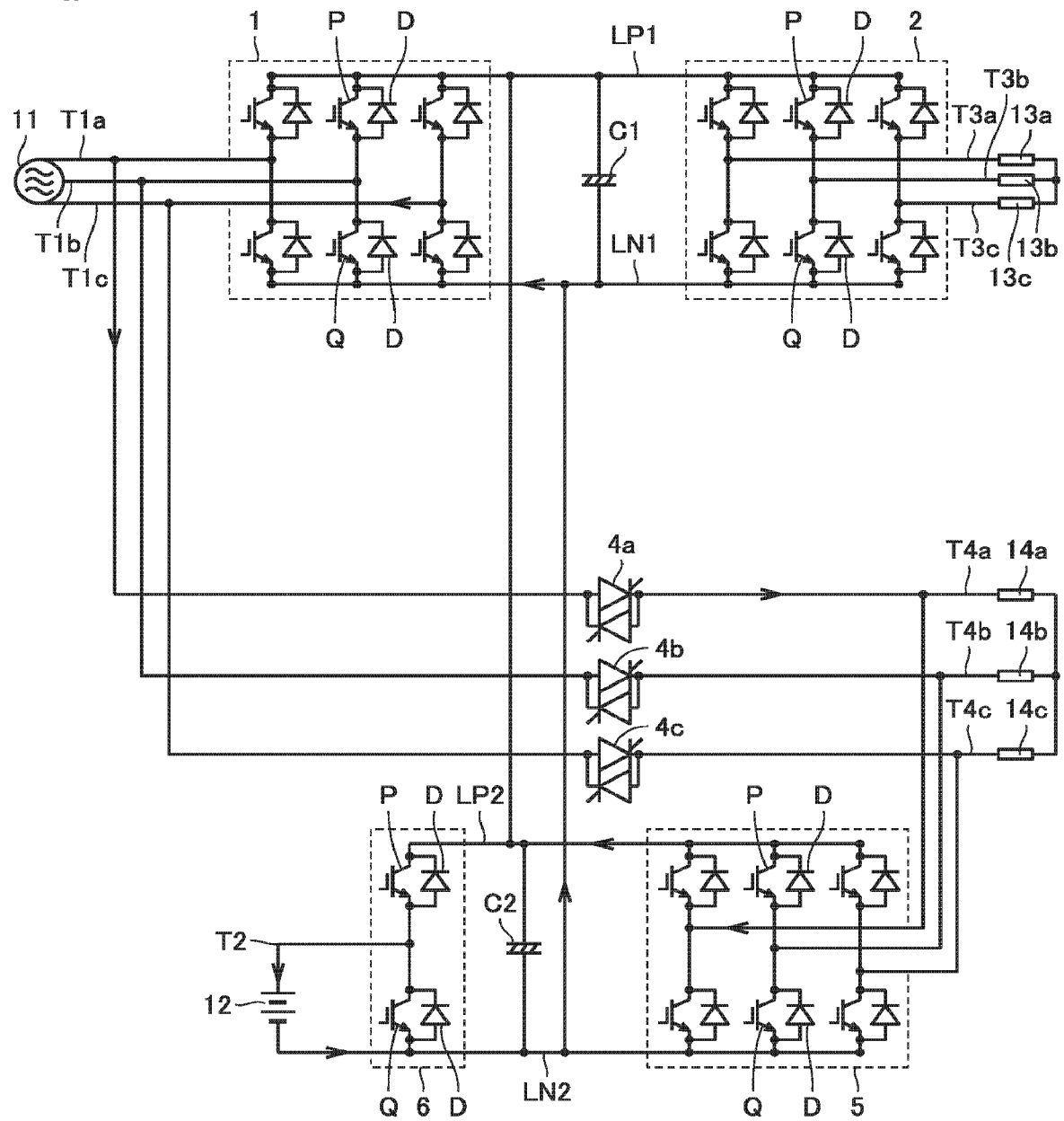
FIG. 14 is a circuit diagram for explaining a problem of the uninterruptible power supply shown in FIG. 13.

FIG. 14 is a circuit block diagram for explaining a problem of the uninterruptible power supply shown in FIG. 13, FIG. 14 being contrasted with FIG. 5. With reference to FIG. 14, in the uninterruptible power supply, bidirectional chopper 3 is not provided, DC positive buses LP1, LP2 are connected to each other, and DC negative buses LN1, LN2 are connected to each other.

When such an uninterruptible power supply is operated, a circulating circuit may be formed from commercial AC power source 11 through AC input terminal T1a, high-speed switch 4a, diode D of bidirectional power converter 5, DC positive bus LP2, transistor P of bidirectional chopper 6, battery terminal T2, battery 12, DC negative bus LN2, DC negative bus LN1, diode D of converter 1, and AC input terminal T1c to commercial AC power source 11, as indicated by the arrows in FIG. 14, causing a flow of circulating current.

Intrinsically, the sum of three-phase AC current flowing from commercial AC power source 11 to converter 1 is 0 A, and the sum of three-phase AC current flowing from commercial AC power source 11 through high-speed switches 4a-4c to bidirectional power converter 5 is 0 A. The sum of current flowing from bidirectional chopper 6 to the positive electrode of battery 12 and current flowing from bidirectional chopper 6 to the negative electrode of battery 12 is 0 A. However, if the above-described circulating current flows, each sum of the currents is not 0 A, making it difficult to accurately control a current flowing through converter 1, bidirectional power converter 5, and bidirectional chopper 6.

Such a problem can be overcome in methods similar to the methods shown in FIGS. 6-12, namely, methods with isolation transformers 20-23 placed on the path where an AC current flows in a circulating circuit, and methods with diodes placed on the path where a DC current flows. Methods with isolation transformers 20-23 placed are as shown in FIGS. 6-8. Methods with diodes placed are slightly different from the ones shown in FIGS. 9-12.

Figure 15:
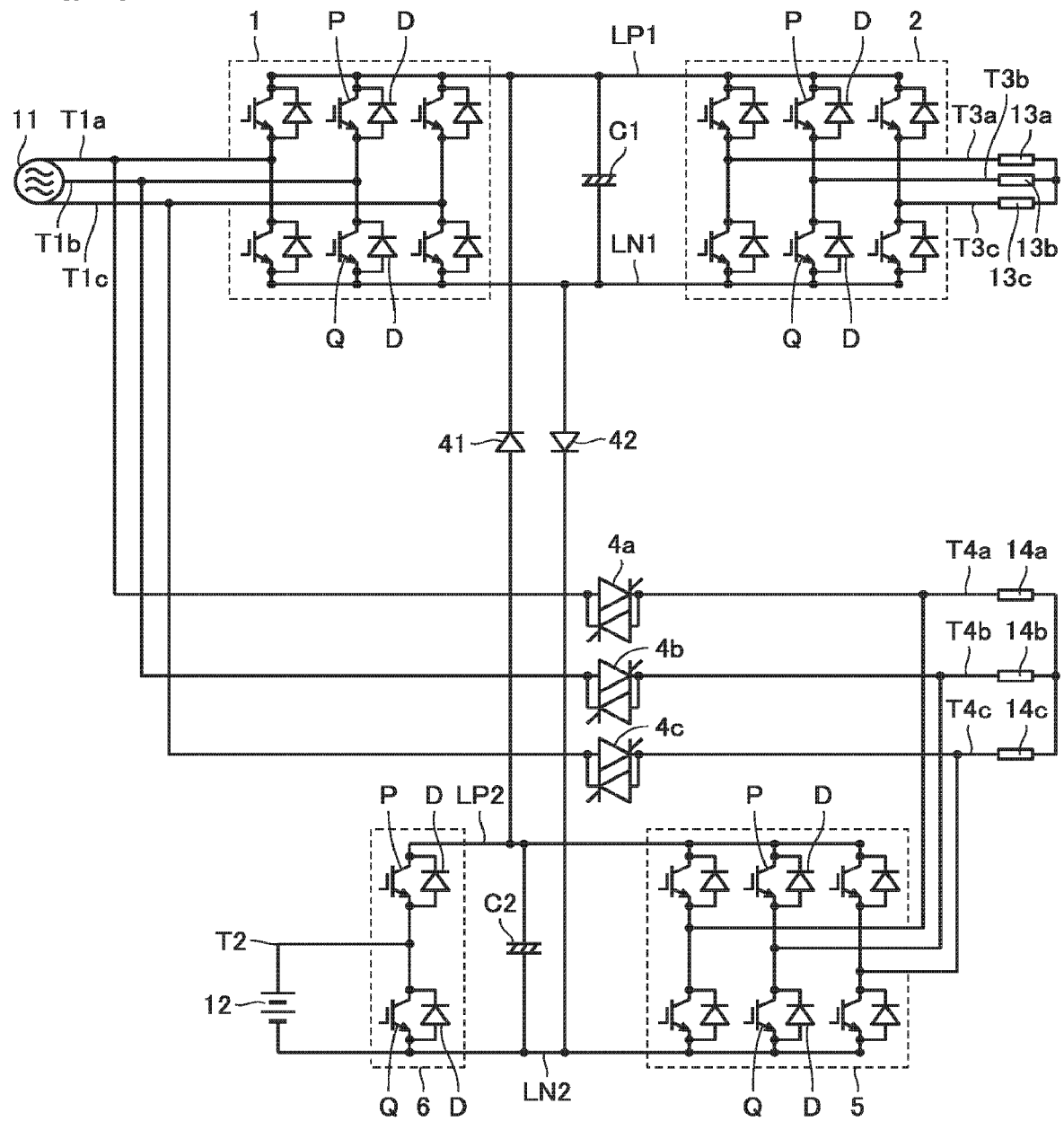
FIG. 15 is a circuit diagram showing a configuration of an uninterruptible power supply according to Embodiment 6 of the present invention.

FIG. 15 is a circuit diagram showing a configuration of an uninterruptible power supply according to Embodiment 6 of the present invention, FIG. 15 being contrasted with FIG. 14. With reference to FIG. 15, the uninterruptible power supply is different from the uninterruptible power supply of FIG. 14 in that the former additionally includes diodes 41, 42. Diode 41 has an anode connected to DC positive bus LP2, and has a cathode connected to DC positive bus LP1. Diode 42 has an anode connected to DC negative bus LN1, and has a cathode connected to DC negative bus LN2. Diodes 41, 42 allow a current to flow from battery 12 through bidirectional chopper 6 to inverter 2, and prohibit a current from flowing from converter 1 through bidirectional chopper 6 to battery 12.

During a normal time when three-phase AC power is supplied from commercial AC power source 11, three-phase AC power from commercial AC power source 11 is converted into DC power by converter 1. The DC power is converted into three-phase AC power by inverter 2, so that the converted power is supplied to loads 13a-13c. Further, high-speed switches 4a-4c are ON, and three-phase AC power from commercial AC power source 11 is supplied to loads 14a-14c. Also, three-phase AC power from commercial AC power source 11 is converted into DC power by bidirectional power converter 5, and the DC power is stored in battery 12 by bidirectional chopper 6. During this time, diodes 41, 42 interrupt the circulating current indicated by the arrows in FIG. 14.

During a power failure time when supply of three-phase AC power from commercial AC power source 11 is stopped, the operation of converter 1 is stopped and high-speed switches 4a-4c are OFF. DC power in battery 12 is supplied to inverter 2 through bidirectional chopper 6 and diodes 41, 42 and is converted into three-phase AC power by inverter 2, so that the converted power is supplied to loads 13a-13c. Further, DC power in battery 12 is supplied to bidirectional power converter 5 by bidirectional chopper 6 and is converted into three-phase AC power by bidirectional power converter 5, so that the converted power is supplied to loads 14a-14c. During this time, since the operation of converter 1 is stopped and high-speed switches 4a-4c are OFF, a circulating circuit is not formed.

With Embodiment 6, the same advantageous effects as those of Embodiment 5 can be obtained. In addition, a flow of circulating current can be prevented, enabling accurate control of a current flowing through converter 1, inverter 2, bidirectional power converter 5, and bidirectional chopper 6.

Embodiment 7

Figure 16:
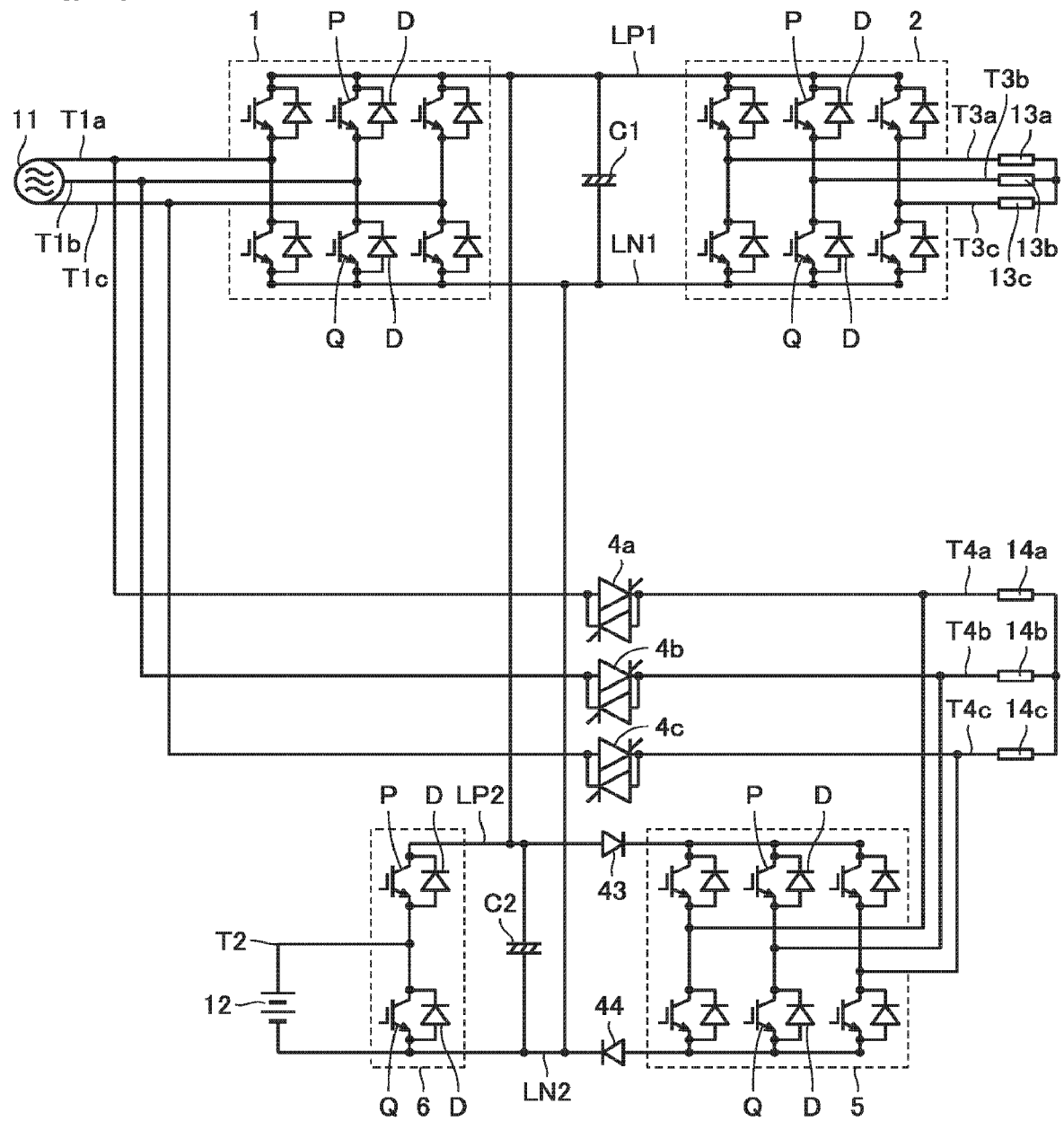
FIG. 16 is a circuit diagram showing a configuration of an uninterruptible power supply according to Embodiment 7 of the present invention.

FIG. 16 is a circuit diagram showing a configuration of an uninterruptible power supply according to Embodiment 7 of the present invention, FIG. 16 being contrasted with FIG. 14. With reference to FIG. 16, the uninterruptible power supply is different from the uninterruptible power supply of FIG. 14 in that the former additionally includes diodes 43, 44.

Diode 43 has an anode connected to DC positive buses LP1, LP2, and has a cathode connected to the collectors of transistors P of bidirectional power converter 5. Diode 44 has an anode connected to the emitters of transistors Q of bidirectional power converter 5, and has a cathode connected to DC negative buses LN1, LN2. Diodes 43, 44 allow a current to flow from battery 12 through bidirectional chopper 6 to bidirectional power converter 5, and prohibit a current from flowing from bidirectional power converter 5 through bidirectional chopper 6 to battery 12.

During a normal time when three-phase AC power is supplied from commercial AC power source 11, three-phase AC power from commercial AC power source 11 is converted into DC power by converter 1 and the DC power is stored in battery 12 by bidirectional chopper 6. Also, the DC power is converted into three-phase AC power by inverter 2, so that the converted power is supplied to loads 13a-13c. Further, high-speed switches 4a-4c are ON, and three-phase AC power from commercial AC power source 11 is supplied to loads 14a-14c through high-speed switches 4a-4c. Bidirectional power converter 5 is not operated. During this time, diodes 43, 44 interrupt the circulating current indicated by the arrows in FIG. 14.

During a power failure time when supply of three-phase AC power from commercial AC power source 11 is stopped, the operation of converter 1 is stopped and high-speed switches 4a-4c are OFF. DC power in battery 12 is supplied to inverter 2 by bidirectional chopper 6 and is converted into three-phase AC power, so that the converted power is supplied to loads 13a-13c. Further, DC power in battery 12 is supplied to bidirectional power converter 5 through bidirectional chopper 6 and diodes 43, 44, and is converted into three-phase AC power, so that the converted power is supplied to loads 14a-14c. During this time, since the operation of converter 1 is stopped and high-speed switches 4a-4c are OFF, a circulating circuit is not formed.

With Embodiment 7, the same advantageous effects as those of Embodiment 5 can be obtained. In addition, a flow of circulating current can be prevented, enabling accurate control of a current flowing through converter 1, inverter 2, bidirectional power converter 5, and bidirectional chopper 6.

Embodiment 8

Figure 17:
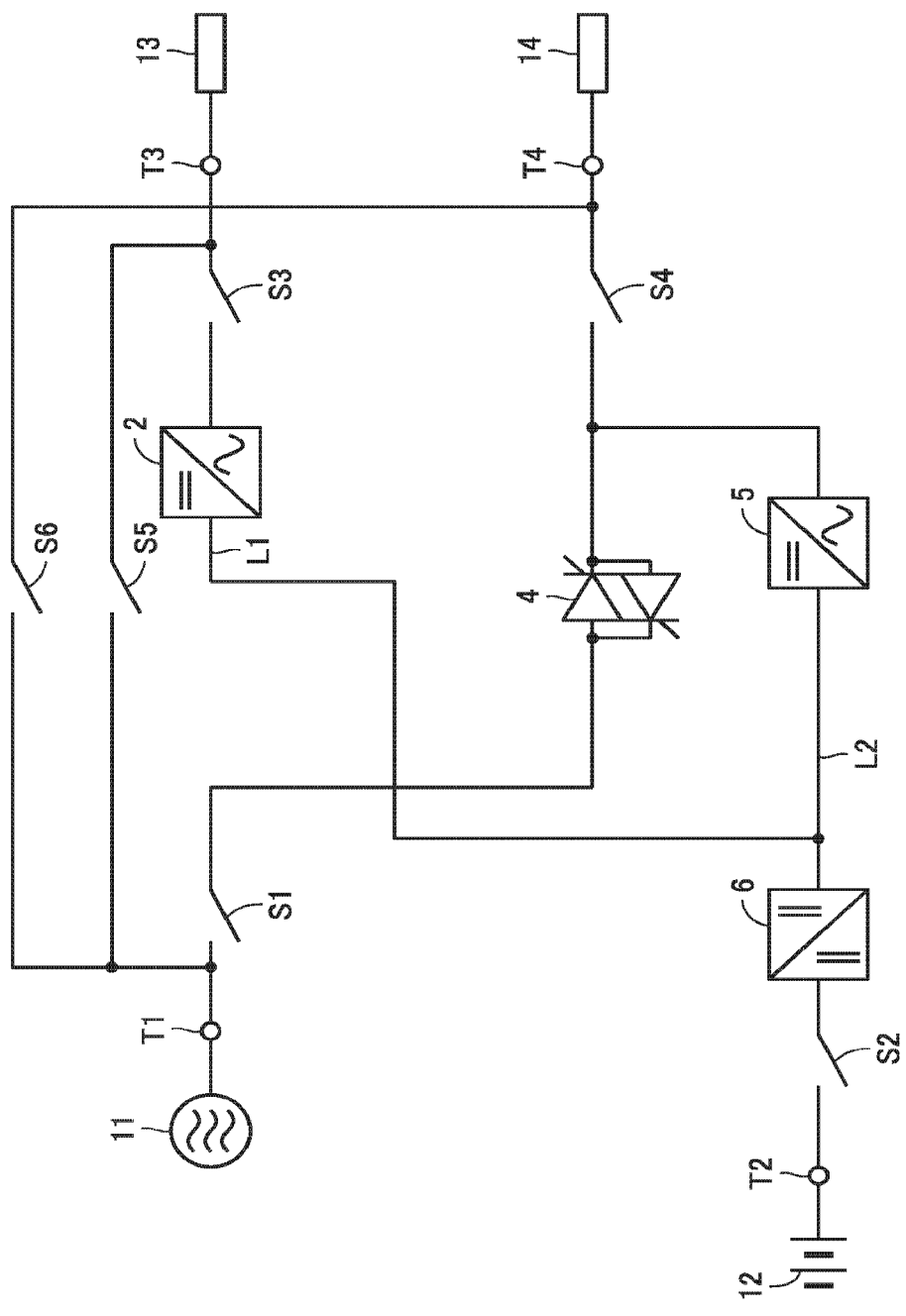
FIG. 17 is a circuit block diagram showing a configuration of an uninterruptible power supply according to Embodiment 8 of the present invention.

FIG. 17 is a circuit diagram showing a configuration of an uninterruptible power supply according to Embodiment 8 of the present invention, FIG. 17 being contrasted with FIG. 13. With reference to FIG. 17, the uninterruptible power supply is different from the uninterruptible power supply of FIG. 13 in that converter 1 is not provided and in that the input node of inverter 2 is connected to DC bus L2.

Inverter 2 constitutes a first uninterruptible power source on a full-time inverter feeding system. High-speed switch 4, bidirectional power converter 5, and bidirectional chopper 6 constitute a second uninterruptible power source on a full-time commercial feeding system. High-speed switch 4, bidirectional power converter 5, and bidirectional chopper 6 are shared by the first and second uninterruptible power sources.

During a normal time when AC power is supplied from commercial AC power source 11, high-speed switch 4 is ON and AC power from commercial AC power source 11 is supplied to load 14 through high-speed switch 4. Also, AC power from commercial AC power source 11 is converted into DC power by bidirectional power converter 5. DC power generated by bidirectional power converter 5 is stored in battery 12 by bidirectional chopper 6 and is also converted into AC power by inverter 2, so that the converted power is supplied to load 13.

During a power failure time when supply of AC power from commercial AC power source 11 is stopped, high-speed switch 4 is OFF and DC power in battery 12 is supplied to inverter 2 and bidirectional power converter 5 by bidirectional chopper 6. Inverter 2 converts DC power supplied from battery 12 through bidirectional chopper 6 into AC power, and supplies the converted power to load 13. Bidirectional power converter 5 converts DC power supplied from battery 12 through bidirectional chopper 6 into AC power, and supplies the converted power to load 14. The other features and operations are the same as those of Embodiment 1, and thus the explanations for them are not repeated.

With Embodiment 8, the same advantageous effects as those of Embodiment 5 can be obtained. In addition, since converter 1 is not provided, downsizing of the device, reduction in cost, and simplification in structure can be achieved. Specifically, the uninterruptible power supply of FIG. 13 requires converter 1 with a rated power of 110 kVA, inverter 2 with a rated power of 100 kVA, bidirectional power converter 5 with a rated power of 110 kVA, and bidirectional chopper 6 with a rated power of 200 kVA in order to operate load 13 with a power consumption of 100 kVA and load 14 with a power consumption of 100 kVA. The reason why the rated power of each of converter 1 and bidirectional power converter 5 is not 100 kVA but 110 kVA is that about 10% of the rated power is typically used to charge battery 12. Embodiment 8, which eliminates the need for converter 1 with 110 kVA, leads to great advantageous effects.

Further, in Embodiment 8, a circulating circuit is not formed because converter 1 is not provided. This eliminates the need for isolation transformers or diodes to interrupt a circulating current and thus can achieve downsizing of the device, reduction in cost, and simplification in structure.

The embodiments disclosed here should be considered illustrative in all respects, not limitative. It is intended that the scope of the present invention is defined not by the above description but by the claims, and that the scope of the invention includes all the modifications in the meaning and scope equivalent to the claims.

REFERENCE SIGNS LIST

T1, T1a-T1c: AC input terminal; T2, T2a-T2c: battery terminal; T3, T3a-T3c, T4, T4a-T4c: AC output terminal; S1-S6: switch; 1: converter; 2: inverter; 3, 6: bidirectional chopper; 4, 4a-4c: high-speed switch; 5: bidirectional power converter; 11: commercial AC power source; 12: battery; 13, 13a-13c, 14, 14a-14c: load; P, Q: transistor; D, 31-34, 41-44: diode; LP1, LP2: DC positive bus; LN1, LN2: DC negative bus; L1, L2: DC bus; C1, C2: capacitor; 20-23: isolation transformer

The invention claimed is:

1. An uninterruptible power supply comprising:
a first terminal configured to receive AC power from a commercial AC power source;
a second terminal connected to a power storage device;
a third terminal connected to a first load;
a fourth terminal connected to a second load;
a first uninterruptible power source connected to the first to third terminals; and
a second uninterruptible power source connected to the first, second, and fourth terminals, wherein
the first uninterruptible power source is configured to:
  convert AC power from the commercial AC power source into DC power, store the DC power in the power storage device, and convert the DC power into AC power to supply the converted power to the first load, during a normal time when AC power is supplied from the commercial AC power source; and
  convert DC power in the power storage device into AC power to supply the converted power to the first load, during a power failure time when supply of AC power from the commercial AC power source is stopped,
the second uninterruptible power source is configured to supply AC power from the commercial AC power source to the second load during the normal time, and being configured to convert DC power in the power storage device into AC power to supply the converted power to the second load during the power failure time,
the first uninterruptible power source includes:
  a converter connected to the first terminal and configured to convert AC power from the commercial AC power source into DC power;
  an inverter connected to the third terminal and configured to convert DC power into AC power to supply the converted power to the first load; and
  a first bidirectional chopper connected to the second terminal, the first bidirectional chopper being configured to store DC power generated by the converter in the power storage device during the normal time, and being configured to supply DC power in the power storage device to the inverter during the power failure time,
the second uninterruptible power source includes:

a high-speed switch connected between the first terminal and the fourth terminal, the high-speed switch being configured to be ON during the normal time, and being configured to be OFF during the power failure time;

a bidirectional power converter connected to the fourth terminal, the bidirectional power converter being configured to convert AC power supplied from the commercial AC power source through the high-speed switch into DC power during the normal time, and being configured to convert DC power into AC power to supply the converted power to the second load during the power failure time; and a second bidirectional chopper connected to the second terminal, the second bidirectional chopper being configured to store DC power generated by the bidirectional power converter in the power storage device during the normal time, and being configured to supply DC power in the power storage device to the bidirectional power converter during the power failure time, the uninterruptible power supply further comprises:

a first switch connected between the first terminal and an input node of the converter and between the first terminal and one terminal of the high-speed switch;

a second switch connected between the second terminal and the first bidirectional chopper and between the second terminal and the second bidirectional chopper;

a third switch connected between the third terminal and an output node of the inverter;

a fourth switch connected between the fourth terminal and the other terminal of the high-speed switch and between the fourth terminal and the bidirectional power converter;

a fifth switch connected between the first terminal and the third terminal; and a sixth switch connected between the first terminal and the fourth terminal, during operation of the uninterruptible power supply, the first to fourth switches are ON and the fifth and sixth switches are OFF, and during maintenance of the uninterruptible power supply, the first to fourth switches are OFF and the fifth and sixth switches are ON.

2. The uninterruptible power supply according to claim 1, further comprising an isolation transformer having a primary terminal connected to the first terminal and one terminal of the high-speed switch and having a secondary terminal connected to an input node of the converter, the isolation transformer being configured to transmit AC power from the commercial AC power source to the converter.

3. The uninterruptible power supply according to claim 1, further comprising an isolation transformer having a primary terminal connected to the first terminal and an input node of the converter and having a secondary terminal connected to one terminal of the high-speed switch, the isolation transformer being configured to transmit AC power from the commercial AC power source to the second load and the bidirectional power converter through the high-speed switch.

4. The uninterruptible power supply according to claim 1, further comprising an isolation transformer having a primary terminal connected to one terminal of the high-speed switch and having a secondary terminal connected to the fourth terminal and the bidirectional power converter, the isolation transformer being configured to transmit AC power supplied from the commercial AC power source through the high-speed switch to the second load and the bidirectional power converter.

5. The uninterruptible power supply according to claim 1, further comprising an isolation transformer having a primary terminal connected to one terminal of the high-speed switch and the fourth terminal and having a secondary terminal connected to the bidirectional power converter, the isolation transformer being configured to transmit AC power supplied from the commercial AC power source through the high-speed switch to the bidirectional power converter.

6. The uninterruptible power supply according to claim 1, further comprising a rectifier element configured to allow a current to flow from the power storage device through the first bidirectional chopper to the inverter, and configured to prohibit a current from flowing from the converter through the first bidirectional chopper to the power storage device.

7. The uninterruptible power supply according to claim 1, further comprising a rectifier element configured to allow a current to flow from the power storage device through the second bidirectional chopper to the bidirectional power converter, and configured to prohibit a current from flowing from the bidirectional power converter through the second bidirectional chopper to the power storage device.

8. An uninterruptible power supply comprising:

a first terminal configured to receive AC power from a commercial AC power source;

a second terminal connected to a power storage device;

a third terminal connected to a first load;

a fourth terminal connected to a second load;

a first uninterruptible power source connected to the first to third terminals; and a second uninterruptible power source connected to the first, second, and fourth terminals, wherein the first uninterruptible power source is configured to:

convert AC power from the commercial AC power source into DC power, store the DC power in the power storage device, and convert the DC power into AC power to supply the converted power to the first load, during a normal time when AC power is supplied from the commercial AC power source; and convert DC power in the power storage device into AC power to supply the converted power to the first load, during a power failure time when supply of AC power from the commercial AC power source is stopped, the second uninterruptible power source is configured to supply AC power from the commercial AC power source to the second load during the normal time, and being configured to convert DC power in the power storage device into AC power to supply the converted power to the second load during the power failure time, the first uninterruptible power source includes:

a converter connected to the first terminal and configured to convert AC power from the commercial AC power source into DC power; and an inverter connected to the third terminal and configured to convert DC power into AC power to supply the converted power to the first load, the second uninterruptible power source includes:

a high-speed switch connected between the first terminal and the fourth terminal, the high-speed switch being configured to be ON during the normal time, and being configured to be OFF during the power failure time;

a bidirectional power converter connected to the fourth terminal, the bidirectional power converter being configured to convert AC power supplied from the commercial AC power source through the high-speed switch into DC power during the normal time, and being configured to convert DC power into AC power to supply the converted power to the second load during the power failure time; and a bidirectional chopper connected to the second terminal, the bidirectional chopper being configured to store DC power generated by the converter and the bidirectional power converter in the power storage device during the normal time, and being configured to supply DC power in the power storage device to the inverter and the bidirectional power converter during the power failure time, the bidirectional chopper is shared by the first uninterruptible power source and the second uninterruptible power source, the uninterruptible power supply further comprises:
  a first switch connected between the first terminal and an input node of the converter and between the first terminal and one terminal of the high-speed switch;
  a second switch connected between the second terminal and the bidirectional chopper;
  a third switch connected between the third terminal and an output node of the inverter;
  a fourth switch connected between the fourth terminal and the other terminal of the high-speed switch and between the fourth terminal and the bidirectional power converter;
  a fifth switch connected between the first terminal and the third terminal; and
  a sixth switch connected between the first terminal and the fourth terminal,
during operation of the uninterruptible power supply, the first to fourth switches are ON and the fifth and sixth switches are OFF, and
during maintenance of the uninterruptible power supply, the first to fourth switches are OFF and the fifth and sixth switches are ON.

9. The uninterruptible power supply according to claim 8, further comprising an isolation transformer having a primary terminal connected to the first terminal and one terminal of the high-speed switch and having a secondary terminal connected to an input node of the converter, the isolation transformer being configured to transmit AC power from the commercial AC power source to the converter.

10. The uninterruptible power supply according to claim 8, further comprising an isolation transformer having a primary terminal connected to the first terminal and an input node of the converter and having a secondary terminal connected to one terminal of the high-speed switch, the isolation transformer being configured to transmit AC power from the commercial AC power source to the second load and the bidirectional power converter through the high-speed switch.

11. The uninterruptible power supply according to claim 8, further comprising an isolation transformer having a primary terminal connected to one terminal of the high-speed switch and having a secondary terminal connected to the fourth terminal and the bidirectional power converter, the isolation transformer being configured to transmit AC power supplied from the commercial AC power source through the high-speed switch to the second load and the bidirectional power converter.

12. The uninterruptible power supply according to claim 8, further comprising an isolation transformer having a primary terminal connected to one terminal of the high-speed switch and the fourth terminal and having a secondary terminal connected to the bidirectional power converter, the isolation transformer being configured to transmit AC power supplied from the commercial AC power source through the high-speed switch to the bidirectional power converter.

13. The uninterruptible power supply according to claim 8, further comprising a rectifier element configured to allow a current to flow from the power storage device through the bidirectional chopper to the inverter, and configured to prohibit a current from flowing from the converter through the bidirectional chopper to the power storage device.

14. The uninterruptible power supply according to claim 8, further comprising a rectifier element configured to allow a current to flow from the power storage device through the bidirectional chopper to the bidirectional power converter, and configured to prohibit a current from flowing from the bidirectional power converter through the bidirectional chopper to the power storage device.

15. An uninterruptible power supply comprising:
  a first terminal configured to receive AC power from a commercial AC power source;
  a second terminal connected to a power storage device;
  a third terminal connected to a first load;
  a fourth terminal connected to a second load;
  a first uninterruptible power source connected to the first to third terminals; and
  a second uninterruptible power source connected to the first, second, and fourth terminals, wherein
the first uninterruptible power source is configured to:
  convert AC power from the commercial AC power source into DC power, store the DC power in the power storage device, and convert the DC power into AC power to supply the converted power to the first load, during a normal time when AC power is supplied from the commercial AC power source; and
  convert DC power in the power storage device into AC power to supply the converted power to the first load, during a power failure time when supply of AC power from the commercial AC power source is stopped,
the second uninterruptible power source is configured to supply AC power from the commercial AC power source to the second load during the normal time, and being configured to convert DC power in the power storage device into AC power to supply the converted power to the second load during the power failure time,
the first uninterruptible power source includes an inverter connected to the third terminal and configured to convert DC power into AC power to supply the converted power to the first load,
the second uninterruptible power source includes:
  a high-speed switch connected between the first terminal and the fourth terminal, the high-speed switch being configured to be ON during the normal time, and being configured to be OFF during the power failure time;
  a bidirectional power converter connected to the fourth terminal, the bidirectional power converter being configured to convert AC power supplied from the commercial AC power source through the high-speed switch into DC power during the normal time, and being configured to convert DC power into AC power to supply the converted power to the second load during the power failure time; and
  a bidirectional chopper connected to the second terminal, the bidirectional chopper being configured to store DC power generated by the bidirectional power converter in the power storage device during the normal time, and being configured to supply DC power in the power storage device to the inverter and the bidirectional power converter during the power failure time, the high-speed switch, the bidirectional power converter, and the bidirectional chopper are shared by the first uninterruptible power source and the second uninterruptible power source the uninterruptible power supply further comprises:
- a first switch connected between the first terminal and one terminal of the high-speed switch;
- a second switch connected between the second terminal and the bidirectional chopper;
- a third switch connected between the third terminal and an output node of the inverter;
- a fourth switch connected between the fourth terminal and the other terminal of the high-speed switch and between the fourth terminal and the bidirectional power converter;
- a fifth switch connected between the first terminal and the third terminal; and
- a sixth switch connected between the first terminal and the fourth terminal, during operation of the uninterruptible power supply, the first to fourth switches are ON and the fifth and sixth switches are OFF, and during maintenance of the uninterruptible power supply, the first to fourth switches are OFF and the fifth and sixth switches are ON.

* * * * *